Figure 6:
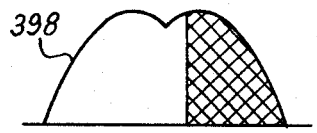

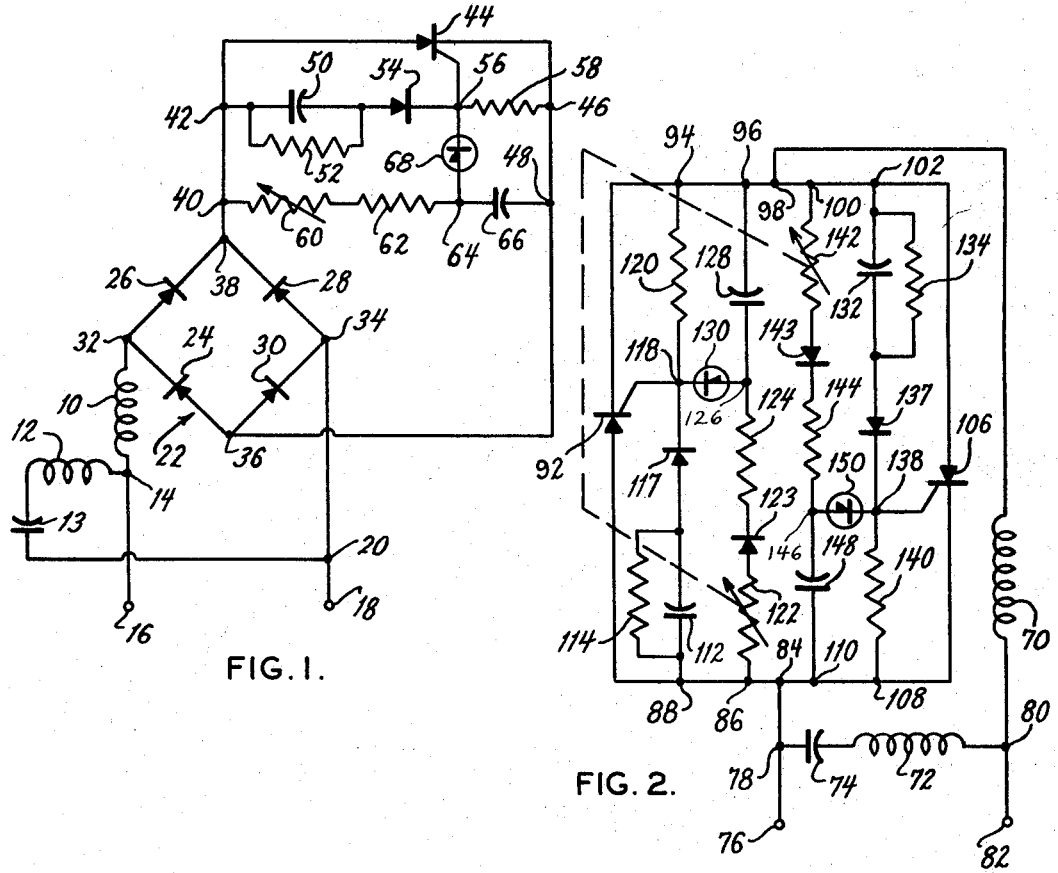
FIG. 1.
FIG. 2.
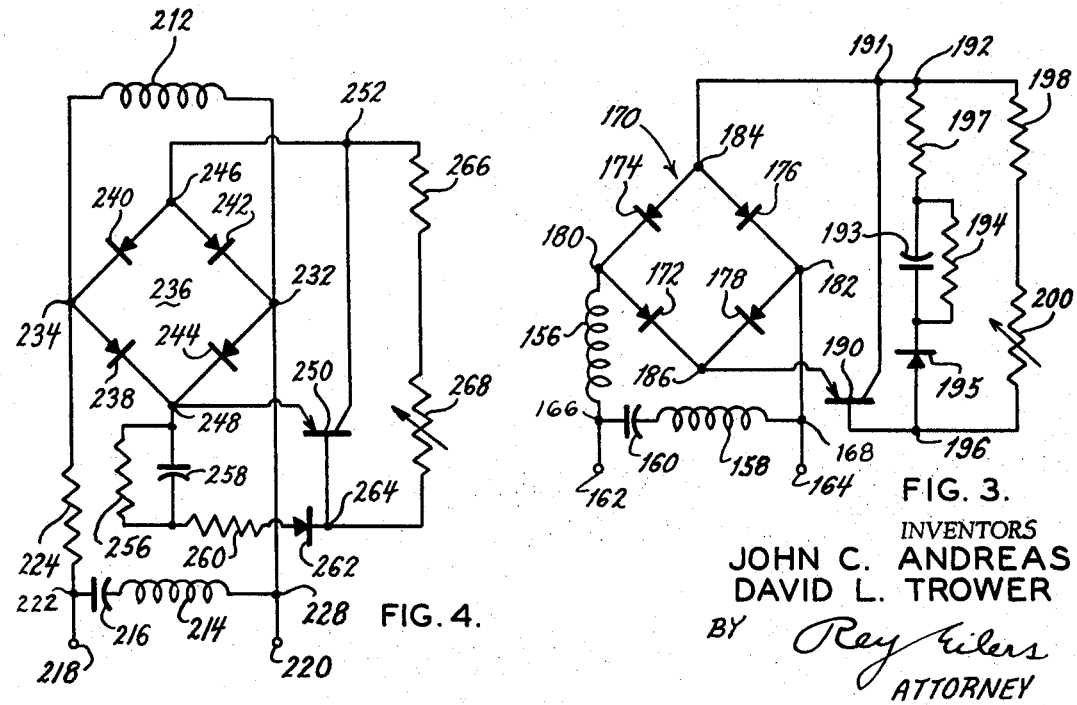
FIG. 4.
FIG. 3.
INVENTORS
JOHN C. ANDREAS
DAVID L. TROWER
BY *Rey Eilers*
ATTORNEY June 18, 1968　　　J. C. ANDREAS ETAL　　　3,389,315
STEPLESS SPEED CONTROL FOR INDUCTION MOTOR
Filed Nov. 12, 1963　　　　　　　　　　　　2 Sheets-Sheet 2

INVENTORS
JOHN C. ANDREAS
DAVID L. TROWER
BY
*Ray Eilers*
ATTORNEY

3,389,315
STEPLESS SPEED CONTROL FOR INDUCTION MOTOR

John C. Andreas, Des Peres, and David L. Trower, St. Louis County, Mo., assignors to Century Electric Company, St. Louis, Mo., a corporation of Missouri
Filed Nov. 12, 1963, Ser. No. 322,985
15 Claims. (Cl. 318—221)

This invention relates to improvements in dynamo electric machines. More particularly, this invention relates to improvements in control systems for electric motors.

It is, therefore, an object of the present invention to provide an improved control system for an electric motor.

It would be desirable to have a control system for an electric motor which could provide stepless control of the speed of that motor. It would be particularly desirable if that control system could enable that motor to provide full starting torque regardless of the speed setting of that control system. Moreover, it would be desirable if that control system could be made so it did not require moving parts and so it did not utilize bulky magnetic components such as transformers, reactors, or the like. The present invention provides such a control system; and it is, therefore, an object of the present invention to provide a control system for an electric motor which provides step-less control of the speed of that motor, which enables that motor to provide full starting torque regardless of the speed setting of that control system, which has no moving parts, and which has no bulky magnetic components.

The control system provided by the present invention utilizes a variable impedance element and utilizes reactive components to vary the effective impedance of that variable impedance element. That variable impedance element and those reactive components constitute a combination starting circuit and running circuit for the motor; and the starting portion of that circuit will, whenever the motor is to be started, automatically cause the impedance of the variable impedance element to assume a value which will cause full voltage to be supplied to the motor, regardless of the speed setting of the control system. Subsequently, the circuit will automatically change the impedance of the variable impedance element to reduce the voltage, supplied to the motor, to the desired value. That value will be set by the running portion of the circuit; and that portion will establish and maintain that value after the rotor of the motor has gotten up to speed. The operation of the combination starting circuit and running circuit is automatic—the starting portion of that circuit automatically enabling the motor to provide full starting torque, and the running portion of that circuit subsequently and automatically causing the rotor of the motor to rotate at the desired speed. It is, therefore, an object of the present invention to provide a control system wherein a variable impedance element and reactive components constitute a combination starting circuit and running circuit, wherein the starting portion of that circuit automatically causes the impedance of the variable impedance element to assume one value whenever the motor is to be started, and wherein the running portion of that circuit subsequently and automatically causes that variable impedance to assume a second and different value.

Other and further objects and advantages of the present invention should become apparent from an examination of the drawing and accompanying description.

In the drawing and accompanying description several preferred embodiments of the present invention are shown and described, but it is to be understood that the drawing and accompanying description are for the purpose of illustration only and do not limit the invention and that the invention will be defined by the appended claims.

In the drawing, FIG. 1 is a schematic diagram of one preferred form of control system that is made in accordance with the principles and teachings of the present invention, FIG. 2 is a schematic diagram of a second preferred form of control system that is made in accordance with the principles and teachings of the present invention, FIG. 3 is a schematic diagram of a third preferred form of control system that is made in accordance with the principles and teachings of the present invention.

Figure 5:
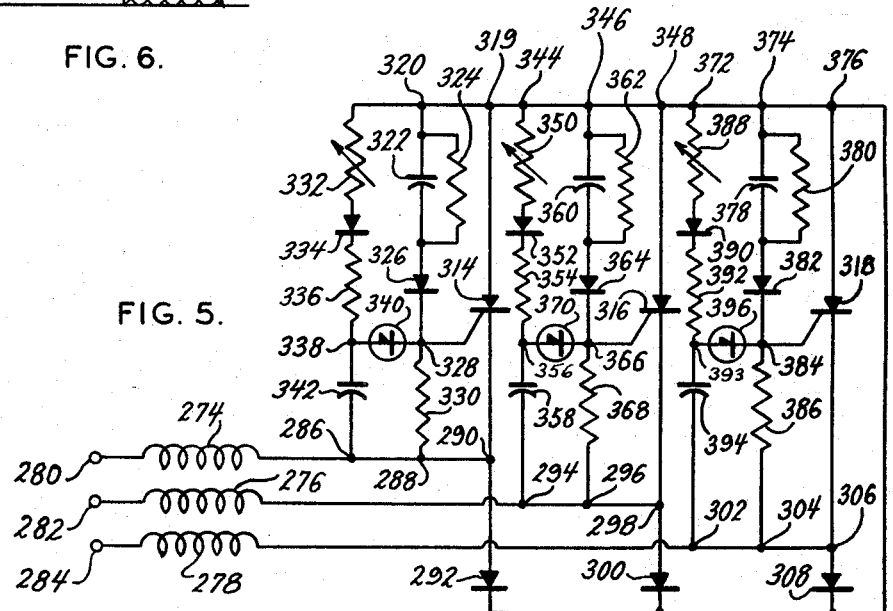
Figure 7:
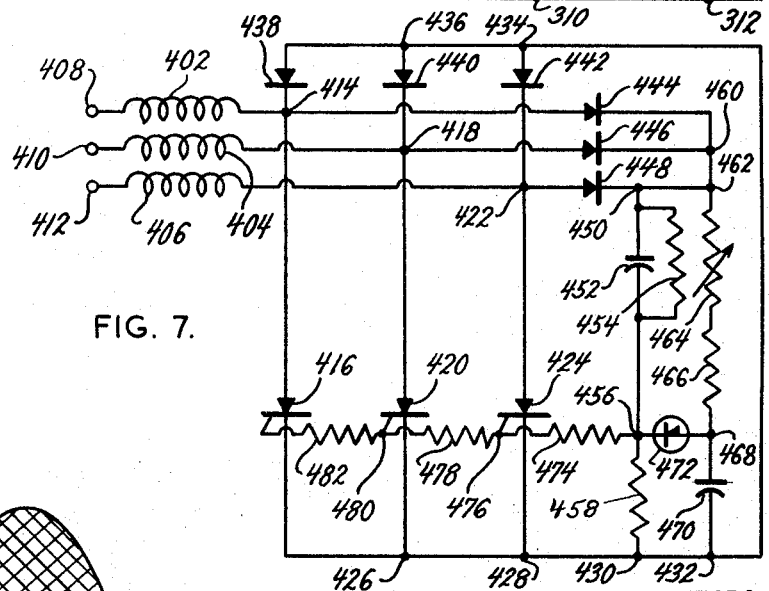
Figure 8:
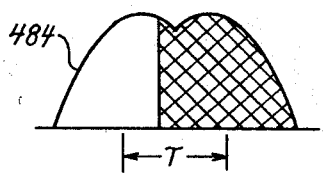

FIG. 4 is a schematic diagram of a fourth preferred form of control system that is made in accordance with the principles and teachings of the present invention, FIG. 5 is a schematic diagram of a fifth preferred form of control system that is made in accordance with the principles and teachings of the present invention, FIG. 6 is an illustration of a wave form provided by the form of control system shown in FIG. 5, FIG. 7 is a schematic diagram of a sixth preferred form of control system that is made in accordance with the principles and teachings of the present invention, and FIG. 8 is an illustration of a wave form provided by the form of control system shown in FIG. 7.

Referring to FIG. 1 in detail, the numeral 10 denotes the main winding of a single phase induction motor of standard and usual design. The numeral 12 denotes the phase winding of that motor, and the numeral 13 denotes the capacitor of that motor. Terminals 16 and 18 are connectable to a suitable source of single phase alternating current, and the terminal 16 is connected to one end of the main winding 10 and to one end of the phase winding 12 by a junction 14. The terminal 18 is connected to the other end of the phase winding 12 by a junction 20 and the capacitor 13.

The numeral 22 generally denotes a bridge rectifier; and that bridge rectifier has diodes 24, 26, 28 and 30. One of the input terminals of the bridge rectifier 22 is denoted by the numeral 32; and that input terminal is connected to the other end of the main winding 10. The other input terminal 34 of the bridge rectifier 22 is connected to the terminal 18 by the junction 20. Output terminal 38 of the bridge rectifier 22 is connected to the anode of a controlled rectifier 44 by junctions 40 and 42; and output terminal 36 of that bridge rectifier is connected to the cathode of that controlled rectifier by junctions 48 and 46. The controlled rectifier 44 preferably is a silicon controlled rectifier.

A resistor 52 and a capacitor 50 are connected in parallel, and they have the left-hand terminals thereof connected to the junction 42. The right-hand terminals of that resistor and capacitor are connected to the anode of a diode 54. The cathode of that diode is connected to the junction 46 by a junction 56 and a resistor 58. The junction 56 is directely connected to the gate of the controlled rectifier 44.

An adjustable resistor 60 has the left-hand end thereof connected to the junction 40, and the right-hand end of that adjustable resistor is connected to the junction 48 by a resistor 62, a junction 64, and a capacitor 66. The junction 64 is connected to the junction 56 by an avalanche diode 68.

The parallel-connected capacitor 50 and resistor 52, the diode 54, and the resistor 58 constitute part of the starting portion of the combination starting circuit and running circuit for the motor; and the adjustable resistor 60, the resistor 62, the capacitor 66, the avalanche diode 68, and the resistor 58 constitute part of the running portion of the combination starting circuit and running circuit for the motor. It will be noted that the circuit of FIG. 1 has no moving parts.

At the instant the terminals 16 and 18 are connected to the source of alternating current by switch contacts or relay contacts, not shown, the capacitors 13, 50 and 66 will be substantially free of electrical charges, and the controlled rectifier 44 will be non-conductive. If, at the time the terminals 16 and 18 are connected to the source of alternating current, the voltage at terminal 16 is positive relative to the voltage at terminal 18, current will flow via junction 14, phase winding 12, capacitor 13, and junction 20 to the terminal 18. Current also will flow via junction 14, main winding 10, input terminal 32, diode 26, output terminal 38, junctions 40 and 42, parallel-connected resistor 52 and capacitor 50, diode 54, junction 56, resistor 58, junctions 46 and 48, output terminal 36, diode 30, input terminal 34, and junction 20 to the terminal 18. In addition, current will flow via junction 14, main winding 10, input terminal 32, diode 26, output terminal 38, junction 40, adjustable resistor 60, resistor 62, junction 64, capacitor 66, junction 48, output terminal 36, diode 30, input terminal 34, and junction 20 to the terminal 18. The overall impedance of capacitor 50 and resistor 58 will initially be many times smaller than the overall impedance of capacitor 66, resistor 62 and adjustable resistor 60—in one preferred form being twenty-two times as small—and hence most of the current flowing from the output terminal 38 will initially flow through capacitor 50, diode 54, junction 56 and resistor 58, and only a very small amount of that current will initially flow through adjustable resistor 60, resistor 62, junction 64, and capacitor 66. Because the controlled rectifier 44 is non-conductive at this time, none of the current from the output terminal 38 will flow through that controlled rectifier. While an appreciable amount of current will flow through the capacitor 50, diode 54, junction 56, and resistor 58, the amount of current will be much too small to cause the rotor of the motor to start rotating.

As current flows through capacitor 50, diode 54, junction 56, and resistor 58, a substantial voltage drop will quickly develop across that resistor; and that voltage drop will be applied to the gate-to-cathode circuit of the controlled rectifier 44. That controlled rectifier will respond to that voltage drop to become conductive; and, thereupon, current will flow via junction 14, main winding 10, input terminal 32, diode 26, output terminal 38, junctions 40 and 42, controlled rectifier 44, junctions 46 and 48, output terminal 36, diode 30, input terminal 34, and junction 20 to the terminal 18. As the controlled rectifier 44 becomes conductive, it will coact with the diodes 26 and 30 to provide a low resistance path between input terminal 32 and junction 20. This is desirable; because it will enable substantially full voltage to be applied to the main winding 10, and that voltage will enable the motor to provide full starting torque—irrespective of the setting of the adjustable resistor 60. This means that almost immediately after the terminals 16 and 18 are connected to a source of alternating current, the main winding 10 will apply strong rotative forces to the rotor of the motor.

As the controlled rectifier 44 became conductive, it substantially "short circuited" the series-connected capacitor 50, diode 54, and resistor 58; and hence further flow of current through that capacitor was substantially halted. That capacitor will tend to discharge through the resistor 52; but the value of that resistor is sufficiently large to prevent rapid discharging of that capacitor. The diode 54 will keep that capacitor from discharging through the controlled rectifier 44. All of this means that during the first half-cycle of the alternating current supplied to the terminals 16 and 18, a limited charge was developed across the capacitor 50, and a powerful rotative force was applied to the rotor of the motor. At the end of that half-cycle, the value of the current flowing through the controlled rectifier 44 will decrease to such an extent that the said controlled rectifier will again become non-conductive.

During the next half-cycle of the alternating current supplied to the terminals 16 and 18, the voltage at the terminal 18 will be positive relative to the voltage at the terminal 16; and hence current will flow via junction 20, capacitor 13, phase winding 12, and junction 14 to the terminal 16. Current also will flow via junction 20, input terminal 34, diode 28, output terminal 38, junctions 40 and 42, parallel-connected capacitor 50 and resistor 52, diode 54, junction 56, resistor 58, junctions 46 and 48, output terminal 36, diode 24, input terminal 32, main winding 10, and junction 14 to the terminal 16. Current also will flow via junction 20, input terminal 34, diode 28, output terminal 38, junction 40, adjustable resistor 60, resistor 62, junction 64, capacitor 66, junction 48, output terminal 36, diode 24, input terminal 32, main winding 10, and junction 14 to the terminal 16. The amount of current flowing through adjustable resistor 60, resistor 62, and capacitor 66 will be very small; and most of the current will flow through capacitor 50, diode 54, junction 56 and resistor 58. Substantially no current will flow through the controlled rectifier 44, because that controlled rectifier will be non-conductive.

As the current flows through capacitor 50, diode 54, and resistor 58 during the second half-cycle of the alternating current supplied to the terminals 16 and 18, a substantial voltage drop will develop across the resistor 58; and that voltage drop will be applied to the gate-to-cathode circuit of the controlled rectifier 44. That controlled rectifier will respond to that voltage drop to become conductive; and, thereupon, current will flow via junction 20, input terminal 34, diode 28, output terminal 38, junctions 40 and 42, controlled rectifier 44, junctions 46 and 48, output terminal 36, diode 24, input terminal 32, main winding 10, and junction 14 to the terminal 16. As the controlled rectifier 44 again becomes conductive, it will coact with the diodes 28 and 24 to provide a low resistance path between input terminal 34 and main winding 10. This is desirable; because it will enable substantially full voltage to be applied to the main winding 10, and that voltage will enable the motor to provide full starting torque—irrespective of the setting of the adjustable resistor 60. This means that during the second half-cycle of the alternating current, the main winding 10 will apply strong rotative forces to the rotor of the motor.

As the controlled rectifier 44 again became conductive, it substantially "short circuited" the series-connected capacitor 50, diode 54, and resistor 58; and hence further flow of current through that capacitor was substantially halted. That capacitor will tend to discharge through the resistor 52; but the value of that resistor is sufficiently large to prevent rapid discharging of that capacitor. The diode 54 will keep that capacitor from discharging through the controlled rectifier 44. All of this means that during the second half-cycle of the alternating current supplied to the terminals 16 and 18, a further charge was added to the capacitor 50, and a powerful rotative force was applied to the rotor of the motor. The total charge in the capacitor 50 will still be relatively small, because substantially no current flows through that capacitor after the controlled rectifier 44 becomes conductive. However, the charge on the capacitor 50 will increase the impedance of the series-connected capacitor 50, diodes 54, and resistor 58. At the end of the second half-cycle of the alternating current supplied to the terminals 16 and 18, the value of the current flowing through the controlled rectifier 44 will decrease to such an extent that the said controlled rectifier will again become non-conductive.

During the third half-cycle of the alternating current supplied to the terminals 16 and 18, current will again flow through capacitor 50, diode 54, and resistor 58 to develop a substantial voltage drop across that resistor; and the controlled rectifier 44 will again respond to that voltage drop to become conductive. This is desirable; because it will enable substantially full voltage to be applied to the main winding 10, and that voltage will enable the motor to provide full starting torque—irrespective of the setting of the adjustable resistor 60. Also, the controlled rectifier 44 will again "short circuit" the series-connected capacitor 50, diode 54 and resistor 58; but that capacitor will have received an additional charge before the controlled rectifier 44 became conductive. All of this means that during the third half-cycle of the alternating current supplied to the terminals 16 and 18, a further charge was added to the capacitor 50, and a powerful rotative force was applied to the rotor of the motor.

During the fourth half-cycle of the alternating current supplied to the terminals 16 and 18, current will again flow through capacitor 50, diode 54 and resistor 58 to develop a substantial voltage drop across that resistor; and the controlled rectifier 44 will again respond to that voltage drop to become conductive. This is desirable, because it will enable substantially full voltage to be applied to the main winding 10, and that voltage will enable the motor to provide full starting torque—irrespective of the setting of the adjustable resistor 60. Also, the controlled rectifier 44 will again "short circuit" the series-connected capacitor 50, diode 54, and resistor 58; but that capacitor will have received an additional charge before the controlled rectifier 44 became conductive. All of this means that during the fourth half-cycle of the alternating current supplied to the terminals 16 and 18, a further charge was added to the capacitor 50, and a powerful rotative force was applied to the rotor of the motor.

During a number of succeeding half-cycle of the alternating current supplied to the terminals 16 and 18, further small charges will be supplied to the capacitor 50, and the controlled rectifier 44 will recurrently enable substantially full voltage to be applied to the main winding 10. The rotor of the motor will respond to the rotative forces provided by the main winding 10 to start rotating and to apply full starting torque to the load.

After the rotor of the motor has gotten up to speed, the charges supplied to the capacitor 50 will increase the voltage across that capacitor until it approaches the peak value of the A.C. voltage supplied to the terminals 16 and 18. At such time, the flow of current through capacitor 50, diode 54, and resistor 58 will be incapable of developing a sufficient voltage drop across that resistor to "fire" the controlled rectifier 44. Thereupon, the starting portion of the combination starting circuit and running circuit, which includes capacitor 50, diode 54, and resistor 58 will have performed its function—enabling the motor to provide full starting torque and causing the rotor to come up to speed.

During succeeding half-cycles of the alternating current supplied to the terminals 16 and 18, current will initially flow from the output terminal 38 of the bridge rectifier 22 via junction 40, adjustable resistor 60, resistor 62, junction 64, capacitor 66, and junction 48 to the output terminal 36 of that bridge rectifier. That flow of current will not be large enough to cause the main winding 10 to apply large rotative forces to the rotor of the motor, but that flow of current will charge the capacitor 66; and, as that capacitor becomes charged, the voltage across that capacitor will increase. When that voltage reaches the breakdown voltage of the avalanche diode 66, that avalanche diode will become conductive. Thereupon, current will flow from the upper terminal of capacitor 66 via junction 64, avalanche diode 68, junction 56, resistor 58, and junctions 46 and 48 to the lower terminal of that capacitor. Current also will flow from output terminal 38 via junction 40, adjustable resistor 60, resistor 62, junction 64, avalanche diode 68, junction 56, resistor 58, and junctions 46 and 48 to the output terminal 36. The resulting flow of current through the resistor 58 will develop a voltage drop across that resistor which will "fire" the controlled rectifier 44.

As the controlled rectifier 44 becomes conductive, it will serve as a low resistance shunt across the output terminals of the bridge rectifier 22. As a result, substantially full voltage will be applied across the main winding 10; and that main winding will respond to that voltage to apply strong rotative forces to the rotor of the motor. The controlled rectifier 44 will substantially "short circuit" the series-connected adjustable resistor 60, resistor 62, avalanche diode 68, and resistor 58; and hence substantially no further current will flow through those series-connected elements as long as that controlled rectifier is conductive. However, the capacitor 66 will continue to discharge through the avalanche diode 68 and the resistor 58. The controlled rectifier 44 will remain conductive throughout the rest of the half-cycle, but will again become non-conductive at the end of that half-cycle. Consequently, at the end of the half-cycle, the capacitor 66 will be completely discharged and the controlled rectifier 44 will be non-conductive.

All of this means that during each of the said succeeding half-cycles of the alternating current supplied to the terminals 16 and 18, the controlled rectifier 44 will be non-conductive until the capacitor 66 charges sufficiently to cause the avalanche diode 68 to become conductive; and that the said controlled rectifier will then become conductive and enable the main winding 10 to apply strong rotative forces to the rotor of the motor. The capacitor 66, the resistor 62, and the adjustable resistor 60 will constitute an RC network which will determine the percentage of each half-cycle needed to charge the capacitor 66, and thus to "fire" the controlled rectifier 44. By adjusting the setting of the adjustable resistor, it is possible to vary the duty cycle of the main winding 10, and hence the speed of the rotor of the motor.

During each of the said succeeding half-cycles of the alternating current supplied to the terminals 16 and 18, any charge which may have leaked away from the capacitor 50 during a preceding half-cycle will be restored. Consequently, as long as the terminals 16 and 18 are connected to the source of alternating current, the capacitor 50 will remain substantially fully charged. This means that as long as those terminals remain connected to the source of alternating current, the starting portion of the combination starting circuit and running circuit will remain inactive, and the "firing" of the controlled rectifier will be accomplished by the running portion, of the combination starting circuit and running circuit, which includes adjustable resistor 60, resistor 62, capacitor 66, avalanche 68, and resistor 58.

It will be noted that there are no moving parts in the combination starting circuit and running circuit of the control system of FIG. 1. While the adjustable resistor 60 is adjustable, that resistor need not be adjusted during the starting or running of the motor. Instead, that adjustable resistor will be adjusted only when a change in the speed of the rotor of the motor is desired. Further, it will be noted that the control system of FIG. 1 does not require any bulky magnetic components such as transformers, reactors, or the like. Moreover, it should be noted that the control system of FIG. 1 makes it possible to vary the speed over a range of about six to one and to do so in stepless fashion. With a six pole motor, adjustment of the adjustable resistor 60 can vary the rotor speed from about one hundred and ninety to about eleven hundred and fifty revolutions per minute. With a four pole motor, adjustment of the adjustable resistor 60 can vary the rotor speed from about two hundred and ninety to seventeen hundred and forty revolutions per minute. With a two pole motor, adjustment of the adjustable resistor 60 can vary the rotor speed from about seven hundred to about thirty-five hundred revolutions per minute. In addition, it will be noted that during the starting of the motor, full A.C. voltage is applied to the series-connected phase winding 12 and capacitor 13, and substantially full A.C. voltage is applied to the main winding 10. Consequently, full starting torque is provided for the motor regardless of the setting of the adjustable resistor 60.

Referring to FIG. 2 in detail, the numeral 70 denotes the main winding of another single phase induction motor of standard and usual design. The numeral 72 denotes the phase winding of that motor, and the numeral 74 denotes the capacitor of that motor. Terminals 76 and 82 are selectively connectable to a source of alternating current by switch contacts or relay contacts, not shown; and the terminal 76 is connected to the left-hand terminal of the capacitor 74 by a junction 78. The terminal 82 is connected to the right-hand end of the phase winding 72 and to the lower end of the main winding 70 by a junction 80.

The junction 78 and junctions 84, 86 and 88 connect the terminal 76 with the anode of a controlled rectifier 92; and junctions 94, 96 and 98 connect the cathode of that controlled rectifier to the upper end of the main winding 70. That upper end of that main winding is connected to the anode of a controlled rectifier 106 by the junction 98 and junctions 100 and 102. The cathode of that controlled rectifier is connected to the terminal 76 by junctions 108, 110, 84 and 78.

The numeral 112 denotes a capacitor which has the lower terminal thereof connected to the junction 88, and which has the upper terminal thereof connected to the junction by a diode 117, junction 118, and a resistor 120. A resistor 114 is connected in parallel with the capacitor 112. The lower terminal of an adjustable resistor 122 is connected to the junction 86, and the upper terminal of that adjustable resistor is connected to junction 96 by a diode 123, a resistor 124, a junction 126, and a capacitor 128. An avalanche diode 130 has the anode thereof connected to the junction 126 and has the cathode thereof connected to the gate of the controlled rectifier 92 by the junction 118.

The numeral 132 denotes a capacitor which has the upper terminal thereof connected to the junction 102 and has the bottom terminal thereof connected to the junction 94 by a diode 117, junction 118, and a resistor 140. A resistor 134 is connected in parallel with the capacitor 132. An adjustable resistor 142 has the upper end thereof connected to the junction 100 and has the the other end thereof connected to the junction 110 by a diode 143, a resistor 144, a junction 146, and a capacitor 148. An avalanche diode 150 has the anode thereof connected to the junction 146 and has the cathode thereof connected to the gate of the controlled rectifier 106 by the junction 138. The adjustable elements of the adjustable resistors 122 and 142 will preferably be "ganged" for conjoint adjustment.

The main winding 70, the phase winding 72, and the capacitor 74 in FIG. 2 are comparable to the main winding 10, the phase winding 12, and the capacitor 13 in FIG. 1. The capacitors 112 and 132 and the resistors 114 and 134 in FIG. 2 are comparable to the capacitor 50 and the resistor 52 in FIG. 1. The adjustable resistors 122 and 142, the resistors 124 and 144, the capacitors 128 and 148, and the avalanche diodes 130 and 150 in FIG. 2 are comparable to the adjustable resistor 60, the resistor 62, the capacitor 66, and the avalanche diode 68 of FIG. 1. The controlled rectifiers 92 and 106 of FIG. 2 are generally comparable to the controlled rectifier 44 of FIG. 1.

If it is assumed that the terminals 76 and 82 are connected to a suitable source of alternating current, as by switch contacts or relay contacts, not shown, and if it is further assumed that the voltage at terminal 76 is positive relative to the voltage at terminal 82, current will flow via junction 78, capacitor 74, phase winding 72, and junction 80 to the terminal 82. Current also will flow via junctions 78, 84, 86 and 88, capacitor 112, diode 117, junction 118, resistor 120, junctions 94, 96 and 98, main winding 70, and junction 80 to the terminal 82. In addition, current will flow via junctions 78, 84 and 86, adjustable resistor 122, diode 123, resistor 124, junction 126, capacitor 128, junctions 96 and 98, main winding 70, and junction 80 to the terminal 82. No current will flow through the controlled rectifier 92 because that controlled rectifier is initially non-conductive. No current can flow through diodes 143 and 137 or through the controlled rectifier 106, because the anodes thereof will be negative relative to the cathodes thereof.

The overall impedance of capacitor 112 and resistor 120 will initially be many times smaller than the overall impedance of capacitor 128, resistor 124 and adjustable resistor 122; and hence most of the current flowing past junction 84 will flow through capacitor 112, diode 117, and resistor 120, and only a small part of that current will flow through adjustable resistor 122, diode 123, resistor 124, and capacitor 128. The flow of current through resistor 120 will not be great enough to enable the main winding 70 to apply strong rotative forces to the rotor of the motor, but that flow of current will be great enough to develop a substantial voltage drop across that resistor. That voltage drop will be applied to the gate-to-cathode circuit of the controlled rectifier 92; and the controlled rectifier 92 respond to that voltage drop to become conductive.

As the controlled rectifier 92 becomes conductive, a substantial amount of current will flow via junctions 78, 84, 86 and 88, controlled rectifier 92, junctions 94, 96 and 98, main winding 70, and junction 80 to the terdminal 82. Also, as the controlled rectifier 92 becomes conductive, it will substantially "short circuit" the series-connected capacitor 112, diode 117, and resistor 120 and the series-connected adjustable resistor 122, diode 123, resistor 124, and capacitor 128; and hence substantially no further current will flow through capacitor 112 and capacitor 128. Current will continue to flow through the controlled rectifier 92 until the end of the first half-cycle of the alternating current supplied to the terminals 76 and 82; but, at the end of that half-cycle, that controlled rectifier will become non-conductive.

During that first half-cycle of the alternating current, the capacitor 112 received a charge; and substantially all of that charge will remain on that capacitor—the resistor 114 having a sufficiently large resistance to limit discharge of the capacitor 112, and the diode 117 preventing discharging of that capacitor through the controlled rectifier 92. All of this means that during the first half-cycle of the alternating current, a limited charge was developed across the capacitor 112, and a powerful rotative force was applied to the rotor of the motor. During that half-cycle, the source of alternating current applied substantially full A.C. voltage to the main winding 70.

During the next half-cycle of the alternating current supplied to the terminals 76 and 82, current will flow via junction 80, phase winding 72, capacitor 74, and junction 78 to the terminal 76. Current also will flow via junction 80, main winding 70, junctions 98, 100 and 102, capacitor 132, diode 137, junction 138, resistor 140, and junctions 108, 110, 84 and 78 to the terminal 76. In addition, current will flow via junction 80, main winding 70, junctions 98 and 100, adjustable resistor 142, diode 143, resistor 144, junction 146, capacitor 148, and junctions 110, 84 and 78 to the terminal 76. The overall impedance of capacitor 132 and resistor 140 will initially be many times smaller than the overall impedance of capacitor 148, resistor 144 and adjustable resistor 142; and hence most of the current flowing past the junction 98 will flow through capacitor 132, diode 137, and resistor 140, and only a small part of that current will flow through adjustable resistor 142, diode 143, resistor 144, and capacitor 148. The flow of current through the resistor will not be great enough to enable the main winding 70 to apply strong rotative forces to the rotor of the motor, but will be great enough to develop a substantial voltage drop across that resistor. That voltage drop will cause the controlled rectifier 106 to become conductive.

As that controlled rectifier becomes conductive, a substantial amount of current will flow via junction 80, main winding 70, junctions 98, 100 and 102, controlled recifier 106, and junctions 108, 110, 84 and 78 to the terminal 76. Also, as the controlled rectifier 106 becomes conductive, it will substantially "short circuit" the series-connected capacitor 132, diode 137 and resistor 140 and the series-connected adjustable resistor 142, diode 143, resistor 144, and capacitor 148; and hence substantially no further current will flow through capacitor 132 and capacitor 148. Current will continue to flow through the controlled rectifier 106 until the end of the second half-cycle of alternating current supplied to the terminals 76 and 82; but, at the end of that half-cycle, that controlled rectifier will become non-conductive.

During the second half-cycle of the alternating current, the capacitor 132 received a charge; and substantially all of that charge will remain on that capacitor—the resistor 134 having a sufficiently large resistance to limit discharging of the capacitor 132, and the diode 137 preventing discharging of that capacitor through the controlled rectifier 106. All of this means that during the second half-cycle of the alternating current, a limited charge was developed across the capacitor 132, and a powerful rotative force was applied to the rotor of the motor. During that half-cycle, the source of alternating current applied substantially full A.C. voltage to the main winding 70.

During a number of the succeeding odd-numbered half-cycles of the alternating current supplied to the terminals 76 and 82, current will flow through capacitor 112, diode 117 and resistor 120 and "fire" the controlled rectifier 92; and, thereupon, substantially full A.C. voltage will be applied to the main winding 70. Also, a further charge will be added to the capacitor 112. Similarly, during a number of the succeeding even-numbered half-cycles of the alternating current supplied to the terminals 76 and 82, current will flow through capacitor 132, diode 137 and resistor 140 and "fire" the controlled rectifier 106; and, thereupon, substantially full A.C. voltage will be applied to the main winding 70. Also, a further charge will be added to the capacitor 132. The main winding 70 will respond to such voltages to apply strong rotative forces to the rotor of the motor and, as a result, that rotor will come up to speed. The capacitors 112 and 132 will accumulate the said further charges; and those charges will increase the voltages across those capacitors. After the rotor gets up to speed, the voltages across those capacitors will approach the value of the A.C. voltage supplied to the terminals 76 and 82.

During succeeding half-cycles, of the alternating current supplied to the terminals 76 and 82, the voltages developed across the resistors 120 and 140 by current flowing through the capacitors 112 and 132 will be too small to "fire" the controlled rectifiers 92 and 106. However the starting portions, of the combination starting circuits and running circuits, which include capacitor 112, diode 117 and resistor 120 and include capacitor 132, diode 137 and resistor 140 will have performed their function. Thereafter the controlled rectifiers 92 and 106 will be "fired" by the running portions, of the combination starting circuits and running circuits, which include adjustable resistor 122, diode 123, resistor 124, capacitor 128, avalanche diode 130, and resistor 120 and include adjustable resistor 142, diode 143, resistor 144, capacitor 148, avalanche diode 150, and resistor 140. Specifically, during each succeeding odd-numbered half-cycle of the alternating current, current will flow via junctions 78, 84 and 86, adjustable resistor 122, diode 123, resistor 124, junction 126, capacitor 128, junctions 96 and 98, main winding 70, and junction 80 to the terminal 82. That flow of current will develop a voltage drop across the capacitor 128; and, when that voltage drop reaches the break-down voltage of the avalanche diode 130, that avalanche diode will become conductive. Thereupon, current will flow from the lower terminal of capacitor 128 via junction 126, avalanche diode 130, junction 118, resistor 120, and junctions 94 and 96 to the upper terminal of that capacitor. Current also will flow via junctions 78, 84 and 86, adjustable resistor 122, diode 123, resistor 124, junction 126, avalanche diode 130, junction 118, resistor 120, junctions 94, 96 and 98, main winding 70, and junction 80 to the terminal 82. The resulting flow of current through resistor 120 will develop a voltage drop which will be applied to the gate-to-cathode circuit of the controlled rectifier 92; and that controlled rectifier will respond to that voltage drop to become conductive. As that controlled rectifier conducts, substantially full voltage will be applied across the main winding 70; and that main winding will respond to that voltage to apply strong rotative forces to the rotor of the motor. The controlled rectifier 92 will "short-circuit" the series-connected adjustable resistor 122, diode 123, resistor 124, avalanche diode 130, and resistor 120; and hence substantially no current will flow through those series-connected elements. However, the capacitor 128 will continue to discharge through the avalanche diode 130 and the resistor 120. The controlled rectifier 92 will remain conductive throughout the rest of the half-cycle, but will again become non-conductive at the end of that half-cycle. Consequently, at the end of the half-cycle, the capacitor 128 will be fully discharged and the controlled rectifier 92 will be non-conductive.

During succeeding even-numbered cycles of the alternating current, current will flow via junction 80, main winding 70, junctions 98 and 100, adjustable resistor 142, diode 143, resistor 144, junction 146, capacitor 148, and junctions 110, 84 and 78 to the terminal 76. That flow of current will develop a voltage drop across the capacitor 148; and when that voltage drop reaches the break-down voltage of the avalanche diode 150, that avalanche diode will become conductive. Thereupon, current will flow from the upper terminal of capacitor 148 via junction 146, avalanche diode 150, junction 138, resistor 140, and junctions 108 and 110 to the lower terminal of that capacitor. Current also will flow via junction 80, main winding 70, junctions 98 and 100, adjustable resistor 142, diode 143, resistor 144, junction 146, avalanche diode 150, junction 138, resistor 140, and junctions 108, 110, 84 and 78 to the terminal 76. The resulting flow of current through resistor 140 will develop a voltage drop which will be applied to the gate-to-cathode circuit of the controlled rectifier 106; and that controlled rectifier will respond to that voltage drop to become conductive. As that controlled rectifier becomes conductive, substantial values of current will flow through the main winding 70; and that main winding will respond to that flow of current to apply strong rotative forces to the rotor of the motor. The controlled rectifier 106 will "short-circuit" the series-connected adjustable resistor 142, diode 143, resistor 144, junction 146, avalanche diode 150, junction 138 and resistor 140; and hence substantially no further current will flow through those series-connected elements, as long as that controlled rectifier remains conductive. However, the capacitor 148 will continue to discharge through the avalanche diode 150 and the resistor 140. The controlled rectifier 106 will remain conductive throughout the rest of the half-cycle, but will again become non-conductive at the end of that half-cycle. Consequently, at the end of the half-cycle, the capacitor 148 will be fully discharged and the controlled rectifier 106 will be non-conductive.

All of this means that during each of the said odd-numbered succeeding half-cycles of the alternating current supplied to the terminals 76 and 82, the controlled rectifier 92 will be non-conductive until the capacitor 128 charges sufficiently to cause the avalanche diode 130 to become conductive; and that the said controlled rectifier will then become conductive and enable the main winding 70 to apply strong rotative forces to the rotor of the motor. Further, it means that during each of the said even-numbered succeeding half-cycles of the alternating current supplid to the numerals 76 and 82, the controlled rectifier 106 will be non-conductive until the capacitor 148 charges sufficiently to cause the avalanche diode 150 to become conductive; and that the said controlled rectifier will then become conductive and enable the main winding 70 to apply strong rotative forces to the rotor of the motor. The capacitor 128, the resistor 124, and the adjustable resistor 122 will constitute an RC network which will determine the percentage of each odd-numbered half-cycle needed to charge the capacitor 128, and thus to "fire" the controlled rectifier 92. Similarly, the capacitor 148, the resistor 144, and the adjustable resistor 142 will constitute an RC network which will determine the percentage of each even-numbered half-cycle needed to charge the capacitor 148; and thus to "fire" the controlled rectifier 106. By adjusting the settings of the adjustable resistors 122 and 142 it is possible to vary the duty cycle of the main winding and hence the speed of the rotor of the motor.

During each of the said odd-numbered succeeding half-cycles, any charge which may have leaked away from the capacitor 112 during a preceding half-cycle will be restored. Similarly, during each of the said even-numbered succeeding half-cycles, any charge which may have leaked away from the capacitor 132 during a preceding half-cycle will be restored. Consequently, as long as the terminals 76 and 82 are connected to the source of alternating current, the capacitors 112 and 132 will remain substantially fully charged. This means that as long as those terminals remain connected to the source of alternating current, the starting portions of the combination starting circuits and running circuits will remain inactive, and the "firing" of the controlled rectifiers 92 and 106 will be accomplished by the running portions, of the combination starting circuits and running circuits.

It will be noted that there are no moving parts in the combination starting circuits and running circuits of FIG. 2. While the adjustable resistors 122 and 142 are adjustable, those resistors need not be adjusted during the starting or running of the motor. Instead, those adjustable resistors will be adjusted only when a change in the speed of the rotor of the motor is desired. Further, it will be noted that the control system of FIG. 2 does not require any bulky magnetic components such as transformers, reactors, or the like. Moreover, it should be noted that the control system of FIG. 2 makes it possible to vary the speed of the rotor in step-less fashion over a wide range. In addition, it will be noted that during the starting of the motor, full A.C. voltage is applied to the series-connected phase winding and capacitor and substantially full A.C. voltage is applied to the main winding. Consequently, full starting torque is provided for the motor regardless of the settings of the adjustable resistors 122 and 142.

The circuits of FIGS. 1 and 2 are quite similar in function and operation. However, the circuit of FIG. 1 is less expensive because it has fewer components. The circuits of FIG. 2 can supply more current than the circuit of FIG. 1 can; because the controlled rectifiers 92 and 106 conduct only on alternate half-cycles and can thus remain cool while passing substantial quantities of current.

Referring to FIG. 3 in detail, the numeral 156 denotes the main winding of a single phase induction motor of standard and usual design. The phase winding and the capacitor of that motor are denoted, respectively, by the numerals 158 and 160. The numerals 162 and 164 denote terminals that are connectable to a suitable source of alternating current by switch contacts or relay contacts, not shown. The terminal 162 is connected to the left-hand terminal of the capacitor 160 and to the lower end of the main winding 156 by a junction 166. The terminal 164 is connected to the right-hand end of the phase winding 158 by a junction 168. The upper end of the main winding 156 is connected to input terminal 180 of a bridge rectifier 170; and that bridge rectifier has diodes 172, 174, 176 and 178. The other input terminal of that bridge rectifier is denoted by the numeral 182; and it is connected directly to the junction 168.

The numeral 190 denotes a PNP power transistor; and the emitter of that power transistor is directly connected to output terminal 186 of the bridge rectifier 170. The collector of that power transistor is connected to output terminal 184 of the bridge rectifier 170 by a junction 191. A capacitor 193 is connected between the collector and base of the power transistor 190 by junction 191, a junction 192, a resistor 197, a diode 195, and a junction 196. A resistor 194 is connected in parallel with that capacitor. The collector of the power transistor 190 also is connected to the base of that power transistor by junctions 191 and 192, resistor 198, adjustable resistor 200, and junction 196. While the power transistor 190 has been shown as a single transistor, it can include several power transistors in series or parellel relation.

If it is assumed that the terminals 162 and 164 are connected to a suitable source of alternating current, and if it is further assumed that the voltage at terminal 162 is positive relative to the voltage at terminal 164, current will flow via junction 166, capacitor 160, phase winding 158, and junction 168 to the terminal 164. Current also will flow via junction 166, main winding 156, input terminal 180, diode 172, output terminal 186, the emitter-base circuit of power transistor 190, junction 196, diode 195, capacitor 193, resistor 197, junctions 192 and 191, output terminal 184, diode 176, input terminal 182, and junction 168 to the terminal 164. In addition, current will flow via junction 166, main winding 156, input terminal 180, diode 172, output terminal 186, the emitter-base circuit of the power transistor 190, junction 196, adjustable resistor 200, resistor 198, junctions 192 and 191, output terminal 184, diode 176, input terminal 182, and junction 168 to the terminal 164. Because the capacitor 193 is initially substantially free of electrical charge, the impedance of that capacitor and of resistor 197 will be much less than that of series-connected adjustable resistor 200 and resistor 198; and hence most of the current passing through the emitter-base circuit of the power transistor 190 will pass through the capacitor 193. The value of that current will not be great enough to enable the main winding 156 to apply strong rotative forces to the rotor of the motor but will be great enough to render the emitter-collector circuit of the power transistor 190 fully conductive; and, consequently, large values of current will flow via junction 166, main winding 156, input terminal 180, diode 172, output terminal 186, the emitter-collector circuit of power transistor 190, junction 191, output terminal 184, diode 176, input terminal 182, and junction 168 to the terminal 164.

As the emitter-collector circuit of the power transistor 190 becomes fully conductive, the voltage across the output terminals 184 and 186 of the bridge rectifier 170 will drop almost to zero; and this is desirable because it will enable the source of alternating current to apply substantially full A.C. voltage to the main winding 156. That main winding will respond to that voltage to apply strong rotative forces to the rotor of the motor. Also as the emitter-collector circuit of power transistor 190 becomes fully conductive, it will short-circuit series-connected diode 195, capacitor 193 and resistor 197 and series-connected adjustable resistor 200 and resistor 198. Consequently, substantially no further current will flow through the capacitor 193 throughout the rest of the first half-cycle of the alternating current supplied to the terminals 162 and 164. That capacitor will tend to discharge through the resistor 194; but the resistance of that resistor is large enough to keep that capacitor from discharging rapidly. The diode 195 will keep that capacitor from discharging through the series-connected adjustable resistor 200 and resistor 198. As a result, the capacitor 193 will retain substantially all of the charge which is received before the emitter-collector circuit of the power transistor 190 became fully conductive. The emitter-collector circuit of the power transistor 190 will continue to be fully conductive until the end of the first half-cycle of the alternating current supplied to the terminals 162 and 164. All of this means that during the first half-cycle of the alternating current supplied to the terminals 162 and 164, the capacitor 193 received a small charge and the main winding 156 applied strong rotative forces to the rotor of the motor.

During the next half-cycle of the alternating current supplied to the terminals 162 and 164, current will flow via junction 168, phase winding 158, capacitor 160, and junction 166 to the terminal 162. Current also will flow via junction 168, input terminal 182, diode 178, output terminal 186, the emitter-base circuit of the power transistor 190, junction 196, diode 195, capacitor 193, resistor 197, junctions 192 and 191, output terminal 184, diode 174, input terminal 180, main winding 156, and junction 166 to the terminal 162. In addition, current will flow via junction 168, input terminal 182, diode 178, output terminal 186, the emitter-base circuit of the power transistor 190, junction 196, adjustable resistor 200, resistor 198, junctions 192 and 191, output terminal 184, diode 174, input terminal 180, main winding 156, and junction 166 to the terminal 162. Because the charge on the capacitor 193 will still be small, the impedance of that capacitor, of diode 195 and of resistor 197 will be considerably smaller than the impedance of series-connected adjustable resistor 200 and resistor 198. As a result, most of the current flowing past the junction 196 will flow through the capacitor 193. The value of that current will not be great enough to cause the main winding 156 to apply strong rotative forces to the rotor of the motor, but will be great enough to render the emitter-collector circuit of the power transistor 190 fully conductive.

As that emitter-collector circuit becomes fully conductive, the voltage across the output terminals 184 and 186 of the bridge rectifier 170 will drop almost to zero; and this is desirable because it will enable the source of alternating current to apply substantially full A.C. voltage to the main winding 156. The main winding will respond to that voltage to apply strong rotative forces to the rotor of the motor. Also, as the emitter-collector circuit of the power transistor 190 becomes fully conductive, it will short-circuit series-connected diode 195, capacitor 193 and resistor 197 and series-connected adjustable resistor 200 and resistor 198. Consequently, substantially no further current will flow through the capacitor 193 throughout the rest of the second half-cycle of the alternating current supplied to the terminals 162 and 164. That capacitor will tend to discharge through the resistor 194; but the resistance of that resistor is large enough to keep that capacitor from discharging rapidly. The diode 195 will keep that capacitor from discharging through the series-connected adjustable resistor 200 and resistor 198. Consequently, the capacitor 193 will retain substantially all of the charge which it received before the emitter-collector circuit of the power transistor 190 became fully conductive.

The emitter-collector circuit of the power transistor 190 will continue to be conductive until the end of the second half-cycle. This means that during the said half-cycle, the capacitor 193 received a further charge and the main winding 156 applied strong rotative forces to the rotor of the motor.

During a number of succeeding half-cycles of the alternating current supplied to the terminals 162 and 164, sufficient current will flow through the emitter-base circuit of the power transistor 190 and the series-connected diode 195, capacitor 193 and resistor 197 to render the emitter-collector circuit of that power transistor fully conductive. During each of those half-cycles, a further charge will be developed across the capacitor 193, and additional strong rotative forces will be applied to the rotor of the motor. That rotor will respond to those strong rotative forces to come up to speed.

After the rotor of the motor has gotten up to speed, the capacitor 193 will become sufficiently charged to make the impedance of series-connected diode 195, capacitor 193 and resistor 197 greater than the impedance of series-connected adjustable resistor 200 and resistor 198. Hence, during subsequent half-cycles of the alternating current, current will flow from output terminal 186 of bridge rectifier 170 via the emitter-base circuit of power transistor 190, junction 196, adjustable resistor 200, resistor 198, junctions 192 and 191 to the output terminal 184. The value of that current will be determined by the setting of the adjustable resistor 200, but it will be large enough to render the emitter-collector circuit of power transistor 190 conductive. Consequently, current will flow from the output terminal 186 via the emitter-collector circuit of power transistor 190 and junction 191 to the output terminal 184.

As the emitter-collector circuit of the power transistor 190 becomes conductive, the voltage across the output terminals 184 and 186 will drop substantially; and this is desirable because it will enable the source of alternating current to apply a substantial A.C. voltage to the main winding 156. That main winding will respond to that voltage to apply rotative forces to the rotor of the motor. The emitter-collector circuit of the power transistor 190 will remain conductive throughout the rest of each of those half-cycles but will become non-conductive at the end of each of those half-cycles. This means that during each of the succeeding half-cycles of the alternating current supplied to the terminals 162 and 164, the desired value of A.C. voltage will be applied to the main winding 156 of the motor.

It will be noted that there are no moving parts in the combination starting circuit and runnning circuit of FIG. 3. While the adjustable resistor 200 is adjustable, that adjustable resistor need not be adjusted during the starting or running of the motor. Instead that adjustable resistor will be adjusted only when a change in the speed of the rotor of the motor is desired. Further, it will be noted that the control system of FIG. 3 does not require any bulky magnetic components such as transformers, reactors, or the like. Moreover, it should be noted that the control system of FIG. 3 makes it possible to vary the speed of the rotor in step-less fashion over a wide range. In addition, it will be noted that during the starting of the motor, full A.C. voltage is applied to the series-connected phase winding and capacitor, and substantially full A.C. voltage is applied to the main winding. Consequently, full starting torque is provided for the motor regardless of the setting of the adjustable resistor 200.

The starting portion of the combination starting circuit and running circuit of FIG. 3 automatically enables the source of alternating current to supply substantially full A.C. voltage to the main winding 156 during the starting of the motor. After the rotor of the motor gets up to speed, the running portion of the combination starting circuit and running circuit of FIG. 3 automatically reduces the voltage supplied to the main winding 156 to the level that is required to rotate the rotor of the motor at the desired speed.

Referring to FIG. 4 in detail, the numeral 212 denotes the main winding of a single phase induction motor of standard and usual design. The phase winding and the capacitor of that motor are denoted, respectively, by the numerals 214 and 216. The numerals 218 and 220 denote terminals which can be connected to a suitable source of alternating current; and the terminal 218 is directly connected to the left-hand terminal of the capacitor 216 by a junction 222. The terminal 218 is connected to the left-hand end of the main winding 212 by junction 222, a current-limiting resistor 224, and input terminal 234 of a bridge rectifier 236. The terminal 220 is connected to the right-hand end of the phase winding 214 by a junction 228, and is connected to the right-hand end of the main winding 212 by the junction 228 and input terminal 232 of bridge rectifier 236. That bridge rectifier has diodes 238, 240, 242 and 244. A small choke could be substituted for resistor 224.

A PNP power transistor 250 has the emitter thereof connected to output terminal 248 of the bridge rectifier 236; and the collector of that power transistor is connected to output terminal 246 of that bridge rectifier by a junction 252. Parallel-connected capacitor 258 and resistor 256, a resistor 260, a diode 262 and a junction 264 connect the output terminal 248 to the base of power transistor 250. Junction 264, an adjustable resistor 268, a resistor 266, and junction 252 connect the base of that power transistor to the collector of that power transistor.

If it is assumed that the terminals 218 and 220 are connected to a suitable source of alternating current, and if it further is assumed that the voltage at terminal 218 is positive relative to the voltage at terminal 220, current will flow via junction 222, capacitor 216, phase winding 214, and junction 228 to terminal 220. Current also will flow via junction 222, resistor 224, input terminal 234, main winding 212, input terminal 232, and junction 228 to terminal 220. In addition, current will flow via junction 222, resistor 224, input terminal 234, diode 238, output terminal 248, capacitor 258, resistor 260, diode 262, junction 264, adjustable resistor 268, resistor 266, junction 252, output terminal 246, diode 242, input terminal 232, and junction 228 to terminal 220. Because the capacitor 258 is initially substantially free of electrical charges, the impedance of that capacitor and of resistor 260 and diode 262 will be quite low; and substantially no current will flow through the emitter-base circuit of power transistor 250. Consequently, the emitter-collector circuit of that power transistor will remain non-conductive; and this is desirable because it means that the combined impedances of capacitor 258, resistor 260, diode 262, adjustable resistor 268, and resistor 266 will appear across the output terminals of the bridge rectifier 236. Those combined impedances will make the effective input resistance of the bridge rectifier 236 high; and hence a high A.C. voltage will be applied to the main winding 212. That main winding will respond to that voltage to apply strong rotative forces to the rotor of the motor. This means that during the first half-cycle of the alternating current supplied to the terminals 218 and 220, a small charge was developed across the capacitor 258 and the main winding 212 applied strong rotative forces to the rotor of the motor.

During the second half-cycle of the alternating current, current will flow via junction 228, phase winding 214, capacitor 216, and junction 222 to terminal 218. Current also will flow via junction 228, input terminal 232, main winding 212, input terminal 234, resistor 224, and junction 222 to terminal 218. In addition, current will flow via junction 228, input terminal 232, diode 244, output terminal 248, capacitor 258, resistor 260, diode 262, junction 264, adjustable resistor 268, resistor 266, junction 252, output terminal 246, diode 240, input terminal 234, resistor 224, and junction 222 to terminal 218. Because the charge on the capacitor 258 is still small, the combined impedances of capacitor 258, resistor 260, and diode 262 will be less than the impedance of the emitter-base circuit of power transistor 250. This means that substantially no current will flow through that emitter-base circuit; and hence the emitter-collector circuit of that power transistor will remain non-conductive.

The combined impedances of capacitor 258, resistor 260, diode 262, adjustable resistor 268, and resistor 266 will appear across the output terminals of bridge rectifier 236. Those combined impedances will make the effective input impedance of the bridge rectifier 236 high; and hence a high A.C. voltage will be applied to the main winding 212. That main winding will respond to that voltage to apply strong rotative forces to the rotor of the motor. This means that during the second half-cycle of the alternating current supplied to the terminals 218 and 220, the capacitor 258 received a further charge and the main winding 212 applied strong rotative forces to the rotor of the motor.

During a number of succeeding half-cycles of the alternating current supplied to the terminals 218 and 220, current will flow from output terminal 248 via capacitor 258, resistor 260, diode 262, junction 264, adjustable resistor 268, resistor 266, and junction 252 to the output terminal 246. During those succeeding half-cycles of the alternating current, the combined impedances of capacitor 258, resistor 260 and diode 262 will be less than the impedance of the emitter-base circuit of power transistor 250; and hence the emitter-collector circuit of that power transistor will remain non-conductive.

The combined impedances of capacitor 258, resistor 260, diode 262, adjustable resistor 268, and resistor 266 will appear across the output terminals of bridge rectifier 236. Those combined impedances will make the effective input impedance of the bridge rectifier 236 high; and hence a high A.C. voltage will be applied to the main winding 212. That main winding will respond to that voltage to apply strong rotative forces to the rotor of the motor. This means that during the said succeeding half-cycles of the alternating current, the capacitor 258 received further charges and the main winding 212 applied strong rotative forces to the rotor of the motor.

During each of the said succeeding half-cycles of the alternating current, an additional charge was added to the capacitor 258. After the rotor of the motor gets up to speed, the accumulated charges on the capacitor 258 will increase the impedance of that capacitor to the point where the impedance of the emitter-base circuit of power transistor 250 will be less than the combined impedances of capacitor 258, resistor 260, and diode 262. As a result, during all subsequent half-cycles of the alternating current supplied to the terminals 218 and 220, current will flow from output terminal 248 via the emitter-base circuit of power transistor 250, junction 264, adjustable resistor 268, resistor 266, and junction 252 to the output terminal 246. That flow of current will render the emitter-collector circuit of power transistor 250 conductive; and hence substantial values of current will flow from output terminals 248 via that emitter-collector circuit and junction 252 to the output terminal 246. As the emitter-collector circuit of power transistor 250 becomes conductive, the effective impedance of the bridge rectifier 236 will decrease, and will thus decrease the voltage across the main winding 212. The extent to which the effective impedance of bridge rectifier 236 will be decreased by the rendering of the emitter-collector circuit of power transistor 250 conductive will be determined by the setting of the adjustable resistor 268. That adjustable resistor will be set to cause the voltage developed across the main winding 212 to have the value needed to rotate the rotor of the motor at the desired speed.

In those subsequent half-cycles of the alternating current wherein current flows through the emitter-base circuit of power transistor 250, the diode 262 will keep the capacitor 258 from discharging through that emitter-base circuit. That capacitor will tend to discharge through the resistor 256; but the resistance of that resistor is large enough to prevent rapid discharging of that capacitor. Moreover, during each half-cycle of the alternating current supplied to the terminals 218 and 220, any charge which might have leaked away from the capacitor 258, during a preceeding half-cycle of that alternating current, will be restored. The overall result is that throughout the said subsequent half-cycles of the alternating current, the capacitor 258 will remain sufficiently charged to keep the combined impedances of that capacitor and of resistor 260 and diode 262 larger than the impedance of the emitter-base circuit of power transistor 250. Consequently, that power transistor will become conductive during each of those subsequent half-cycles and will effectively reduce the voltage across the main winding 212 to the value needed to rotate the rotor of the motor at the desired speed.

It will be noted that there are no moving parts in the combination starting circuit and running circuit of the control system of FIG. 4. While the adjustable resistor 268 is adjustable, that resistor need not be adjusted during the starting or running of the motor. Instead, that adjustable resistor will be adjusted only when a change in the speed of the rotor of the motor is desired. Further, it will be noted that the control system of FIG. 4 does not require any bulky magnetic components, such as transformers, reactors, or the like. Moreover, it should be noted that the control system of FIG. 4 makes it possible to vary the speed of the rotor in step-less fashion over a wide range. In addition, it will be noted that during the starting of the motor, full A.C. voltage is applied to the series-connected phase winding and capacitor, and substantially full A.C. voltage is applied in the main winding. Consequently, full starting torque is provided for the motor regardless of the setting of the adjustable resistor 268.

The circuit of FIG. 4 is similar to the circuit of FIG. 3, in that both circuits use power transistors. However, the circuit of FIG. 4 differs from the circuit of FIG. 3 in that the power transistor 250 is essentially in parallel with the main winding 212, whereas the power transistor 190 is essentially in series with the main winding 156. To enable the source of A.C. power to supply large A.C. voltages to the main winding 212 during the starting of the motor, the power transistor 250 must be kept non-conductive until the rotor of the motor comes up to speed; whereas to enable the source of A.C. power to supply large voltages to the main winding 156 during the starting of the motor, the power transistor 190 must be rendered fully conductive until the rotor of the motor comes up to speed. One advantage which the circuit of FIG. 4 possesses over the circuit of FIG. 3 is the ability to make the speed of the rotor of the motor as small as desired.

The resistance of the resistor 224 will not be great enough to materially reduce the voltage across the main winding 212. However, that resistance will be great enough to protect the power transistor 250 from injury due to the flow of excessive currents through it.

The control systems of FIGS. 1–4 are particularly useful with motors that drive blowers and other air-moving devices. However, those control systems can be used with motors that drive other loads.

The control systems of FIGS. 1 and 2 are desirable because they utilize controlled rectifiers; and controlled rectifiers are readily available and are relatively inexpensive. The control systems of FIGS. 3 and 4 are desirable because they utilize power transistors; and power transistors make it possible to reduce motor noise by supplying power to the motor in the form of sine waves.

Referring to FIG. 5 in detail, the numerals 274, 276 and 278 denote the windings of a three phase induction motor of standard and usual design. The numerals 280, 282 and 284 denote terminals which can be connected to a suitable source of three phase alternating current; and the terminal 280 is connected to the left-hand end of the winding 274, the terminal 282 is connected to the left-hand end of the winding 276, and the terminal 284 is connected to the left-hand end of the winding 278. Junctions 286, 288 and 290, a diode 292, and a junction 310 connect the right-hand end of the winding 274 to a junction 312. Junctions 294, 296 and 298, a diode 300 and the junction 310 connect the right-hand end of the winding 276 to the junction 312. Junctions 302, 304 and 306 and a diode 308 connect the right-hand end of the winding 278 to the junction 312. As a result, the windings 274, 276 and 278 are essentially Y-connected.

Junctions 376, 374, 372, 348, 346, 344 and 319 connect the junction 312 to the anode of a controlled rectifier 314. The cathode of that controlled rectifier is directly connected to the junction 290. Junctions 376, 374, 372 and 348 connect the junction 312 to the anode of a controlled rectifier 316; and the cathode of that controlled rectifier is directly connected to the junction 298. Junction 376 connects the junction 312 to the anode of a controlled rectifier 318; and the cathode of that controlled rectifier is directly connected to the junction 306.

Each of the controlled rectifiers 314, 316 and 318 has its own combination starting circuit and running circuit; and those combination starting circuits and running circuits are identical to each other. Further, those combination starting circuits and running circuits are substantially identical to the starting circuit and running circuit for the controlled rectifier 44 of FIG. 1. Thus, the combination starting circuits and running circuits for the controlled rectifiers 314, 316 and 318 have starting portions which, respectively, include parallel-connected capacitor 322 and resistor 324, diode 326 and resistor 330, parallel-connected capacitor 360 and resistor 362, diode 364 and resistor 366, and parallel-connected capacitor 378 and resistor 380, diode 382 and resistor 386. Those parallel-connected capacitors and resistors, diodes and resistors are directly comparable to the parallel-connected capacitor 50 and resistor 52, the diode 54, and the resistor 58 of FIG. 1. Also, the combination starting circuits and running circuits for the controlled rectifiers 314, 316 and 318 have running portions which include, respectively, adjustable resistor 332, diode 334, resistor 336, capacitor 342, avalanche diode 340 and resistor 330, adjustable resistor 350, diode 352, resistor 354, capacitor 358, avalanche diode 370 and resistor 368, and adjustable resistor 388, diode 390, resistor 392, capacitor 394, avalanche diode 396 and resistor 386. Those adjustable resistors, resistors, capacitors, avalanche diodes and resistors are directly comparable to the adjustable resistor 60, the resistor 62, the capacitor 66, the avalanche diode 68, and the resistor 58 of FIG. 1. The diodes 334, 352 and 390 do not have a counterpart in the circuit of FIG. 1, but those diodes are used to prevent undesired flow of current through the running portions of the combination starting circuits and running circuits for the controlled rectifiers 314, 316 and 318 of FIG. 5. The actuators of the adjustable resistors will preferably be "ganged" together to enable the values of resistance of all of those adjustable resistors to be adjusted simultaneously.

If it is assumed that the terminals 280, 282 and 284 are connected to a suitable source of three phase alternating current, and if it further is assumed that the voltage between terminals 280 and 282 is zero and that the voltage between terminals 284 and 282 is greater than the voltage between the terminals 284 and 280, current will flow from terminal 284 via winding 278, junctions 302, 304 and 306, diode 308, junctions 312, 376, 374, 372, 348 and 346, capacitor 360, diode 364, junction 366, resistor 368, junctions 296 and 294, and winding 276 to the terminal 282. Current also will flow from terminal 284 via winding 278, junctions 302, 304 and 306, diode 308, junctions 312, 376, 374, 372, 348, 346 and 344, adjustable resistor 350, diode 352, resistor 354, junction 356, capacitor 358, junction 294, and winding 276 to the terminal 282. The overall impedance of capacitor 360 and resistor 368 will initially be many times smaller than the overall impedance of capacitor 358, resistor 354 and adjustable resistor 350; and hence most of the current flowing past the junction 346 will flow through the capacitor 360. That current will not be large enough to enable the windings 278 and 276 to apply strong rotative forces to the rotor of the motor, but it will be large enough to develop a substantial voltage drop across the resistor 368. That voltage drop will be applied to the gate-to-cathode circuit of the controlled rectifier 316; and that controlled rectifier will respond to that voltage drop to become conductive. As that controlled rectifier becomes conductive, it will provide a low resistance connection between the right-hand end of winding 278 and the right-hand end of winding 276. Consequently, substantially full voltage will be developed across those windings; and those windings will respond to that voltage to apply strong rotative forces to the rotor of the motor.

Also, as the controlled rectifier 316 becomes conductive, it will essentially "short circuit" series-connected capacitor 360, diode 364 and resistor 368 and series-connected adjustable resistor 350, diode 352, resistor 354 and capacitor 358; and hence substantially no further current will flow through the capacitors 360 and 358 as long as that controlled rectifier remains conductive. The diode 364 will keep the capacitor 360 from discharging through the controlled rectifier 316, as that controlled rectifier becomes conductive; and, while that capacitor will tend to discharge through the resistor 362, the resistance of that resistor will be sufficiently large to prevent rapid discharging of that capacitor. Consequently, the capacitor 360 will retain the charge which it received prior to the time the controlled rectifier 316 became conductive.

The voltage between terminals 284 and 280 will decrease progressively, and the voltage at the terminal 280 will become positive relative to the voltage at the terminal 282. However, because the voltage between the terminals 284 and 282 will be greater than the voltage between the terminals 284 and 280 and will also be greater than the voltage between the terminals 280 and 282, only the controlled rectifier 316 will be conductive.

After one-sixth of the first cycle of the alternating current supplied to the terminals 280, 282 and 284 has elapsed, the voltage between the terminals 284 and 280 will be zero and the voltage between the terminals 280 and 282 will be equal to the voltage between the terminals 284 and 282. However, the voltage between the terminals 280 and 282 will be increasing whereas the voltage between the terminals 284 and 282 will be decreasing. Hence, further current that flows through the controlled rectifier 316 will flow through the windings 274 and 276 rather than through the windings 278 and 276—that current flowing from terminal 280 via winding 274, junctions 286, 288 and 290, diode 292, junctions 310, 312, 376, 374, 372 and 348, controlled rectifier 316, junctions 298, 296 and 294, and winding 276 to the terminal 282. That current will continue to flow for about one hundred and twenty degrees.

Also, after one-sixth of the first cycle of the alternating current supplied to the terminals 280, 282 and 284 has elapsed, the voltage at the terminal 280 will become positive relative to the voltage at the terminal 284, and will thus be positive relative to the voltages at both the terminals 284 and 282; and this means that the voltage at the cathode of the controlled rectifier 314 will be positive relative to the voltage at the anode of that controlled rectifier. That controlled recifier will respond to those voltages to become non-conductive.

Also after one-sixth of the first cycle of the alternating current supplied to the terminals 280, 282 and 284 has elapsed, the voltage at the terminal 280 will become positive relative to the voltage at the terminal 284. Thereupon, current will flow from terminal 280 via winding 274, junctions 286, 288 and 290, diode 292, junctions 310, 312, 376 and 374, capacitor 378, diode 382, junction 384, resistor 386, junctions 304 and 302, and winding 278 to the terminal 284. Current also will flow from terminal 280 via winding 274, junctions 286, 288 and 290, diode 292, junctions 310, 312, 376, 374 and 372, adjustable resistor 388, diode 390, resistor 392, junction 393, capacitor 394, junction 302, and winding 278 to the terminal 284. The overall impedance of capacitor 378 and resistor 386 will initially be many times smaller than the overall impedance of capacitor 394, resistor 392 and adjustable resistor 388; and hence most of the current flowing past the junction 374 will flow through the capacitor 378 rather than the capacitor 394. The current flowing through the capacitor 378 will not be large enough to enable the windings 274 and 278 to apply strong rotative forces to the rotor of the motor, but it will be large enough to develop a substantial voltage drop across the resistor 386. That voltage drop will be applied to the gate-to-cathode circuit of the controlled rectifier 318, and that controlled rectifier will respond to that voltage drop to become conductive. As the controlled rectifier 318 becomes conductive, it will constitute a low resistance connection between the right-hand ends of the windings 274 and 278; and, consequently, substantially full voltage will be developed across those windings. Those windings will respond to that voltage to apply strong rotative forces to the rotor of the motor.

Also as the controlled rectifier 318 becomes conductive, it will essentially short circuit series-connected capacitor 378, diode 382 and resistor 386 and series-connected adjustable resistor 388, diode 390, resistor 392 and capacitor 394. Hence, no further current will flow through those capacitors as long as controlled rectifier 318 remains conductive. The diode 382 will keep the capacitor 378 from discharging through the controlled rectifier 318, as that controlled rectifier becomes conductive; and, while that capacitor will tend to discharge through the resistor 380, the resistance of that resistor will be large enough to prevent rapid discharging of that capacitor. Consequently, the capacitor 378 will retain the charge which it received prior to the time the controlled rectifier 318 became conductive.

After one-third of the first cycle of the alternating current supplied to the terminals 280, 282 and 284 has elapsed, the voltage at the terminal 282 will become positive relative to the voltage at the terminal 284. However, the voltage between terminals 282 and 284 will be less than the voltage between the terminals 280 and 284; and hence even though the controlled rectifier 318 is conductive, current will not flow from terminal 282 via winding 276, junctions 294, 296 and 298, diode 300, junctions 310, 312 and 376, controlled rectifier 318, junctions 306, 304 and 302, and winding 278 to the terminal 284. Instead, current will continue to flow from terminal 280 via winding 274, junctions 286, 288 and 290, diode 292, junctions 310, 312 and 376, controlled rectifier 318, junctions 306, 304 and 302, and winding 278 to the terminal 284.

After one-half of the first cycle of the alternating current supplied to the terminals 280, 282 and 284 has elapsed, the voltage between the terminals 280 and 284 and the voltage between the terminals 282 and 284 will be equal; but the voltage between the terminals 280 and 284 will be decreasing, whereas the voltage between terminals 282 and 284 will be increasing. This means that the current which subsequently flows through controlled rectifier 318 will flow through windings 276 and 278 rather than through windings 274 and 278—that current flowing from terminal 282 via winding 276, junctions 294, 296 and 298, diode 300, junctions 310, 312 and 376, controlled rectifier 318, junctions 306, 304 and 302, and winding 278 to terminal 284. That current will continue to flow for about one hundred and twenty degrees.

Also after one-half of the first cycle of the alternating current supplied to terminals 280, 282 and 284 has elapsed, the voltage at terminal 282 will become positive relative to the voltage at terminal 280, and will thus be positive relative to the voltages at both the terminals 280 and 284. The positive voltage at terminal 282 will be applied to the cathode of controlled rectifier 316, and the relatively negative voltages at terminals 280 and 284 will be applied to the anode of that controlled rectifier; and that controlled rectifier will respond to those voltages to become non-conductive.

The positive voltage at the terminal 282 will cause current to flow via winding 276, junctions 294, 296 and 298, diode 300, junctions 310, 312, 376, 374, 372, 348, 346, 344, 319 and 320, capacitor 322, diode 326, junction 328, resistor 30, junctions 288 and 286, and winding 274 to the terminal 280. Current also will flow from terminal 282 via winding 276, junctions 294, 296 and 298, diode 300, junctions 310, 312, 376, 374, 372, 348, 346, 344, 319 and 320, adjustable resistor 332, diode 334, resistor 336, junction 388, capacitor 342, junction 286, and winding 274 to the terminal 280. The overall impedance of capacitor 322 and resistor 330 will initially be many times smaller than the overall impedance of capacitor 342, resistor 336 and adjustable resistor 332; and hence most of the current flowing past the junction 320 will flow through the capacitor 322. That current will not be large enough to cause the windings 276 and 274 to apply strong rotative forces to the rotor of the motor, but it will be large enough to develop a substantial voltage drop across the resistor 330. That voltage drop will be applied to the gate-to-cathode circuit of the controlled rectifier 314; and that controlled rectifier will respond to that voltage drop to become conductive. As that controlled rectifier becomes conductive, it will act as a low resistance connection between the right-hand ends of the windings 276 and 274; and hence substantially full voltage will be applied across those windings. Those windings will respond to that voltage to apply strong rotative forces to the rotor of the motor.

Also as the controlled rectifier 314 becomes conductive, it will short circuit series-connected capacitor 322, diode 326 and resistor 330 and series-connected adjustable resistor 332, diode 334, resistor 336 and capacitor 342. Hence, no further current will flow through those capacitors as long as controlled rectifier 314 remains conductive. The diode 326 will keep the capacitor 322 from discharging through the controlled rectifier 314, as that controlled rectifier becomes conductive; and, while that capacitor will tend to discharge through the resistor 324, the resistance of that resistor will be large enough to prevent rapid discharging of that capacitor. Consequently, the capacitor 322 will retain the charge which it received prior to the time the controlled rectifier 314 became conductive.

After two-thirds of the first cycle of the alternating current supplied to the terminals 280, 282 and 284 have elapsed, the voltage at the terminal 284 will become positive relative to the voltage at the terminal 280. However, the voltage between terminals 284 and 280 will be smaller than the voltage between terminals 282 and 280; and hence even though controlled rectifier 314 is conductive, current will not flow from terminal 284 via winding 278, junctions 302, 304 and 306, diode 308, junctions 312, 376, 374, 372, 348, 346, 344 and 319, controlled rectifier 314, junctions 290, 288 and 286, and winding 274 to the terminal 280. Instead, current will continue to flow from terminal 282 via winding 276, junctions 294, 296 and 298, diode 300, junctions 310, 312, 376, 374, 372, 348, 346, 344 and 319, controlled rectifier 314, junctions 290, 288 and 286, and winding 274 to the terminal 280.

After five-sixths of the first cycle of the alternating current supplied to the terminals 280, 282 and 284 have elapsed, the voltage between the terminals 284 and 280 will equal the voltage between the terminals 282 and 280; but the voltage between terminals 284 and 280 will be increasing, whereas the voltage between terminals 282 and 280 will be decreasing. Hence, further current that flows through the controlled rectifier 314 will flow through windings 278 and 274 rather than windings 276 and 274— that current flowing from terminal 284 via winding 278, junctions 302, 304 and 306, diode 308, junctions 312, 376, 374, 372, 348, 346, 344 and 319, controlled rectifier 314, junctions 290, 288 and 286, and winding 274 to the terminal 280. That current will continue to flow for about one hundred and twenty degrees.

Also, after five-sixths of the first cycle of the alternating current supplied to terminals 280, 282 and 284 have elapsed, the voltage at terminal 284 will become positive relative to the voltage at the terminal 282, and will thus be positive relative to the voltages at both the terminals 282 and 280. This means that a positive voltage will be applied to the cathode of controlled rectifier 318 and that a relatively negative voltage will be applied to the anode of that controlled rectifier; and that controlled rectifier will respond to those voltages to become non-conductive.

As the voltage at the terminal 284 becomes positive relative to the voltage at the terminal 282, current will flow from the terminal 284 via winding 278, junctions 302, 304 and 306, diode 308, junctions 312, 376, 374, 372, 348, and 346, capacitor 360, diode 364, junction 366, resistor 368, junctions 296 and 294, and winding 276 to the terminal 282. Current also will flow from terminal 284 via winding 278, junctions 302, 304 and 306, diode 308, junctions 312, 376, 374, 372, 348, 346 and 344, adjustable resistor 350, diode 352, resistor 354, junction 356, capacitor 358, junction 294, and winding 276 to the terminal 282. As pointed out hereinbefore, most of the current flowing past the junction 346 will flow through the capacitor 360. While that current will not be large enough to enable the windings 278 and 276 to apply strong rotative forces to the rotor of the motor, it will be large enough to develop a substantial voltage drop across the resistor 368. That voltage drop will be applied to the gate-to-to-cathode circuit of the controlled rectifier 316; and that controlled rectifier will respond to that voltage drop to become conductive.

As that controlled rectifier becomes conductive, substantially full voltage will be applied across the windings 278 and 276; and those windings will respond to that voltage to apply strong rotative forces to the rotor of the motor. Also, as that controlled rectifier becomes conductive, it will short circuit series-connected capacitor 360, diode 364 and resistor 368 and series-connected adjustable resistor 350, diode 352, resistor 354 and capacitor 358; and it will thereby prevent the further flow of current through those capacitors.

At the end of the first cycle of the alternating current supplied to the terminals 280, 282 and 284, the voltage at the terminal 280 will again become positive relative to the voltage at the terminal 282. However, the voltage between the terminals 280 and 282 will be less than the voltage between the terminals 284 and 282; and hence, even though the controlled rectifier 316 is conductive, current will not flow from terminal 280 via winding 274, junctions 286, 288 and 290, diodes 292, junctions 310, 312, 376, 374, 372 and 348, controlled rectifier 316, junctions 298, 296 and 294, and winding 276 to the terminal 282. Instead, the current flowing through the controlled rectifier 316 will continue to flow from terminal 284 via winding 278, junctions 302, 304 and 306, diode 308, junctions 312, 376, 374, 372 and 348, controlled rectifier 316, junctions 298, 296 and 294, and winding 276 to the terminal 282.

After one-sixth of the second cycle of the alternating current supplied to the terminals 280, 282 and 284 has elapsed, the voltage between the terminals 280 and 282 and the voltage between the terminals 284 and 282 will be equal; but the voltage between the terminals 280 and 282 will be increasing whereas the voltage between the terminals 284 and 282 will be decreasing. Hence, further current that flows through the controlled rectifier 316 will flow through the windings 274 and 276 rather than through the windings 278 and 276—that current flowing from terminal 280 via winding 274, junctions 286, 288 and 290, diode 292, junctions 310, 312, 376, 374, 372 and 348, controlled rectifier 316, junctions 298, 296 and 294, and winding 276 to the terminal 282. That current will continue to flow for about one hundred and twenty degrees.

Also, after one-sixth of the second cycle of the alternating current supplied to terminals 280, 282 and 284 has elapsed, the voltage at terminal 280 will again become positive relative to the voltage at the terminal 284, and will thus be positive relative to the voltages at both the terminals 284 and 282; and this means that the voltage at the cathode of the controlled rectifier 314 will be positive relative to the voltage at the anode of that controlled rectifier. That controlled rectifier will respond to those voltages to become non-conductive.

As the voltage at terminal 280 again becomes positive relative to the voltage at terminal 284, current will flow from terminal 280 via winding 274, junctions 286, 288 and 290, diode 292, junctions 310, 312, 376, and 374, capacitor 378, diode 382, junction 384, resistor 386, junctions 304 and 302, and winding 278 to terminal 284 in the manner described heerinbefore. That flow of current will apply a further charge to capacitor 378 and will develop an appreciable voltage drop across resistor 386; and controlled rectifier 318 will respond to that voltage drop to become conductive. This means that substantially full voltage will be applied across windings 274 and 278; and those windings will respond to that voltage to apply strong rotative forces to the rotor of the motor. Also, this means that no further current will flow through capacitors 378 and 394 as long as controlled rectifier 318 remains conductive.

After one-third of the second cycle of the alternating current supplied to the terminals 280, 282 and 284 has elapsed, the voltage at the terminal 282 will become positive relative to the voltage at the terminal 284. However, the voltage between terminals 282 and 284 will be less than the voltage between the terminals 280 and 284; and hence even though the controlled rectifier 318 is conductive, current will not flow from terminal 282 via winding 276, junctions 294, 296 and 298, diode 300, junctions 310, 312 and 376, controlled rectifier 318, junctions 306, 304 and 302, and winding 278 to the terminal 284. Instead, current will continue to flow from terminal 280 via winding 274, junctions 286, 288 and 290, diode 292, junctions 310, 312 and 376, controlled rectifier 318, junctions 306, 304 and 302, and winding 278 to the terminal 284.

The rest of the second cycle of the alternating current supplied to the terminals 280, 282 and 284 will be similar to the rest of the first cycle of that alternating current. Moreover, the first and second halves of a number of further cycles of the alternating current supplied to the terminals 280, 282 and 284 will be similar to the first and second halves of the said second cycle of that alternating current. During each of those further cycles, each of the capacitors 360, 378 and 322 will receive an additional charge, and each of the controlled rectifiers 316, 318 and 314 will be rendered conductive.

After the rotor of the motor has gotten up to speed, the voltages across the capacitors 360, 378 and 322 will be close to the peak voltage of the alternating current supplied to the terminals 280, 282 and 284. Consequently, the amount of current which can flow through those capacitors will not be sufficient to develop a sufficiently large voltage drop across the resistors 368, 386 and 330 to "fire" the controlled rectifiers 316, 318 and 314.

This means that during all succeeding cycles of the alternating current supplied to the terminals 280, 282 and 284, current will flow through series-connected adjustable resistor 350, diode 352, resistor 354 and capacitor 358, series-connected adjustable resistor 388, diode 390, resistor 392 and capacitor 394, and series-connected adjustable resistor 332, diode 334, resistor 336, and capacitor 342. The capacitors 358, 394 and 342 will become charged in the same way in which the capacitor 66 of FIG. 1 becomes charged; and when the charges on those capacitors reach the break-down voltages of the avalanche diodes 370, 396 and 340, those capacitors will discharge through the resistors 368, 386 and 330 in the manner in which the capacitor 66 in FIG. 1 discharged through the resistor 58. The flow of current through the resistors 368, 386 and 330 will be augmented by current flowing from the terminals 280, 282 and 284 via the adjustable resistors 350, 388 and 332; hence sufficiently large voltage drops will be developed across the resistors 368, 386 and 330 to "fire" the controlled rectifiers 316, 318 and 314 in the manner in which the controlled rectifier 44 of FIG. 1 is "fired."

The time constants of the RC networks which include series-connected adjustable resistor 332, diode 334, resistor 336 and capacitor 342, series-connected adjustable resistor 350, diode 352, resistor 354 and capacitor 358, and series-connected adjustable resistor 388, diode 390, resistor 392 and capacitor 394 will determine how quickly the controlled rectifiers 314, 316 and 318 can "fire." Those time constants can be adjusted by adjusting the resistances of the adjustable resistors 332, 350 and 388; and those time constants can be adjusted to "fire" the controlled recifier 318 after one-sixth of a cycle has elapsed but before five-sixths of that cycle have elapsed, to "fire" the controlled rectifier 314 after one-half of that cycle has elapsed but before one-sixth of the following cycle has elapsed, and to "fire" the controlled rectifier 316 after five-sixths of the said cycle have elapsed but before one-half of that following cycle has elapsed. Where the adjustable resistors 332, 350 and 388 are adjusted to provide minimum resistance, the controlled rectifier 318 will "fire" shortly after one-sixth of any given succeeding cycle of the alternating current has elapsed, the controlled rectifier 314 will "fire" shortly after one-half of that cycle has elapsed, and the controlled rectifier 316 will "fire" shortly after five-sixths of that cycle have elapsed. This means that the windings 274, 276 and 278 will have a long duty cycle and that the rotor of the motor will rotate at high speed. If the adjustable resistors 332, 350 and 388 are adjusted to provide maximum resistance, the controlled rectifier 318 will not "fire" until almost five-sixths of that given succeeding cycle of the alternating current have elapsed, the controlled rectifier 314 will not "fire" until close to the end of one-sixth of the following cycle, and the controlled rectifier 316 will not "fire" until close to the end of the first-half of that following cycle. This means that the windings 274, 276 and 278 will have a short duty cycle and that the rotor of the motor will rotate at slow speed. Intermediate settings of the adjustable resistors 332, 350 and 388 will provide intermediate speeds for the rotor of the motor.

It will be noted that there are no moving parts in the combination starting circuits and running circuits of the control system of FIG. 5. While the adjustable resistors 332, 350 and 388 are adjustable, those resistors need not be adjusted during the starting or the running of the motor. Instead, those adjustable resistors will be adjusted only when a change in the speed of the rotor of the motor is desired. Further, it will be noted that the control system of FIG. 5 does not require any bulky magnetic components such as transformers, reactors, or the like. Moreover, it should be noted that the control system of FIG. 5 makes it possible to vary the speed of the rotor over a wide range and to do so in step-less fashion. In addition, it will be noted that during the starting of the motor, substantially full voltage is applied to each pair of series-connected windings. Consequently, full starting torque is provided for the motor regardless of the settings of the adjustable resistors 332, 350 and 388.

FIG. 6 shows a curve 398 which represents the voltage available to any one of the windings 274, 276 and 278 of FIG. 5. The cross hatching in FIG. 6 indicates the power which will be supplied to the motor by one of the controlled rectifiers 314, 316 and 318 when the adjustable resistors 332, 350 and 388 have been set to "fire" those controlled rectifiers about one hundred and thirty degrees after a positive voltage is applied to the anodes of those controlled rectifiers and a negative voltage is applied to the cathodes of those controlled rectifiers. That power will rotate the rotor of the motor at a relatively low speed. As the adjustable resistors 332, 350 and 388 are set to provide minimum values of resistance, the leading edge of the cross hatching in FIG. 6 will shift toward the left-hand portion of the curve 398; and the speed of the rotor of the motor will increase. As the adjustable resistors 332, 350 and 388 are set to provide maximum values of resistance, the leading edge of the cross hatching in FIG. 6 will shift toward the right-hand portion of the curve 398; and the speed of the rotor of the motor will decrease. In this way, a full range of speeds for the rotor of the motor is provided.

Referring to FIG. 7 in detail, the numerals 402, 404 and 406 denote the windings of a three phase induction motor. The numerals 408, 410 and 412 denote terminals which can be connected to a suitable source of three phase alternating current, and the terminal 408 is connected to the left-hand end of the winding 402, the terminal 410 is connected to the left-hand end of the winding 404, and the terminal 412 is connected to the left-hand end of the winding 406. The right-hand end of the winding 402 is connected to the anode of a controlled rectifier 416 by a junction 414. The anode of a controlled rectifier 420 is connected to the right-hand end of the winding 404 by a junction 418; and the anode of a controlled rectifier 424 is connected to the right-hand end of the winding 406 by a junction 422. The cathode of the controlled rectifier 416 is connected to a junction 428 by a junction 426, the cathode of the controlled rectifier 420 is connected to the junction 428 by the junction 426, and the cathode of the controlled rectifier 424 is directly connected to the junction 428.

The parallel-connected capacitor 452 and resistor 454 and the resistor 458 are connected to the junction 422 by a diode 448 and a junction 450. The lower terminal of resistor 458 is connected to the junction 428 by a junction 430. The parallel-connected capacitor 452 and resistor 454 and resistor 458 are directly comparable to the parallel-connected capacitor 50 and resistor 52 and the resistor 58 of FIG. 1.

An adjustable resistor 464 has the upper end thereof connected to the junction 450 by a junction 462, and has the lower end thereof connected to the junction 430 by a resistor 466, a junction 468, a capacitor 470 and a junction 432. That adjustable resistor, resistor and capacitor are directly comparable to the adjustable resistor 60, the resistor 62 and the capacitor 66 of FIG. 1. An avalanche diode 472 has the cathode thereof connected to the junction 456 and has the anode thereof connected to the junction 468; and that avalanche diode is directly comparable to the avalanche diode 68 in FIG. 1. Junction 456, a resistor 474 and a junction 476 connect the cathode of that avalanche diode to the gate of the controlled rectifier 424, junction 456, resistor 474, junction 476, a resistor 478 and a junction 480 connect the cathode of that avalanche diode to the gate of the controlled rectifier 420, and junction 456, resistor 474, junction 476, resistor 478, junction 480, and a resistor 482 connect the cathode of that avalanche diode to the gate of the controlled rectifier 416.

A diode 446 and a junction 460 connect the junction 418 with the junction 462; and a diode 444 and the junctions 460 and 462 connect the junction 414 to the junction 450. A junction 434 connects the anode of a diode 442 to the junction 432, and the cathode of that diode is directly connected to the junction 422. Junctions 434 and 436 connect the anodes of diodes 440 and 438 to the junction 432; and the cathodes of those diodes are directly connected, respectively, to the junctions 418 and 414.

The parallel-connected capacitor 452 and resistor 454 and the resistor 458 constitute part of the starting portion of a combination starting circuit and running circuit for each of the controlled rectifiers 416, 420 and 424. The adjustable resistor 464, the resistor 466, the capacitor 470, the avalanche diode 472 and the resistor 458 constitute part of the running portion of that combination starting circuit and running circuit. This means that the control system of FIG. 7 has a combination starting circuit and running circuit which is common to all of the controlled rectifiers of that control system, whereas the control system of FIG. 5 has a separate combination starting circuit and running circuit for each controlled rectifier of that control system.

When the terminals 408, 410 and 412 of FIG. 7 are connected to a source of three phase alternating current, current will flow between whichever two terminals have the largest voltage between them. For example if, at the moment the terminals 408, 410 and 412 are connected to the said source of three phase alternating current, the voltage between terminals 412 and 410 is the largest voltage, current will flow from terminal 412 via winding 406, junction 422, diode 448, junction 450, capacitor 452, junction 456, resistor 458, junctions 430, 432, 434 and 436, diode 440, junction 418, and winding 404 to the terminal 410. Current also will flow from the terminal 412 via winding 406, junction 422, diode 448, junctions 450 and 462, adjustable resistor 464, resistor 466, junction 468, capacitor 470, junctions 432, 434 and 436, diode 440, junction 418, and winding 404 to the terminal 410. The overall impedance of capacitor 452 and resistor 458 will initially be many times smaller than the overall impedance of capacitor 470, resistor 466 and adjustable resistor 464; and hence most of the current flowing past the junction 450 will flow through the capacitor 452. That current will not be large enough to enable the windings 406 and 404 to apply strong rotative forces to the rotor of the motor, but it will be large enough to develop a substantial voltage drop across the resistor 458. That voltage drop will be applied to the gate-to-cathode circuit of the controlled rectifier 424 by junction 456, resistor 474 and junction 476 and by junctions 430 and 428; and that controlled rectifier will respond to that voltage drop to become conductive.

As the controlled rectifier 424 becomes conductive, it will serve as a low resistance connection between the right-hand ends of the windings 406 and 404; and hence substantially full voltage will be applied across those windings. Those windings will respond to that voltage to apply strong rotative forces to the rotor of the motor.

Also as the controlled rectifier 424 becomes conductive, it will "short circuit" series-connected capacitor 452 and resistor 458 and series-connected adjustable resistor 464, resistor 466 and capacitor 470. This means that no further current will flow through those capacitors as long as the voltage between the terminals 412 and 410 is the dominant voltage of the control system of FIG. 7.

The current which flowed through the capacitor 452 before the controlled rectifier 424 became conductive established a small charge across that capacitor. The diode 448 will keep the capacitor 452 from discharging through the controlled rectifier 424 as that controlled rectifier becomes conductive. The capacitor 452 will tend to discharge through the resistor 454, but the resistance of that resistor will be large enough to keep that capacitor from discharging rapidly. As a result, that capacitor will substantially retain the charge which it received before the controlled rectifier 424 became conductive.

During the time the voltage between the terminals 412 and 410 is the dominant voltage of the control system of FIG. 7, the voltage at the terminal 408 will be positive relative to the voltage at the terminal 410 and the voltage at the terminal 412 will be positive relative to the voltage at the terminal 408. The voltage between the terminals 412 and 408 will be decreasing; and, after one-sixth of the first cycle of the alternating current supplied to the terminals 408, 410 and 412 has elapsed, the voltage between the terminals 412 and 408 will be zero. The voltage between terminals 408 and 410 will be increasing; and, after one-sixth of the first cycle has elapsed, the voltage between the terminals 408 and 410 will exceed the voltage between the terminals 412 and 410.

Thereupon, current will flow from terminal 408 via winding 402, junction 414, diode 444, junctions 460, 462 and 450, capacitor 452, junction 456, resistor 458, junctions 430, 432, 434 and 436, diode 440, junction 418, and winding 404 to the terminal 410. Current also will flow from terminal 408 via winding 402, junction 414, diode 444, junctions 460 and 462, adjustable resistor 464, resistor 466, junction 468, capacitor 470, junctions 432, 434 and 436, diode 440, junction 418, and winding 404 to the terminal 410. Because the overall impedance of capacitor 452 and resistor 458 will still be many times smaller than the overall impedance of capacitor 470, resistor 466 and adjustable resistor 464, most of the current flowing past the junction 462 will flow through the capacitor 452. That current will develop a substantial voltage drop across the resistor 458; and that voltage drop will be applied to the gate-to-cathode circuit of the controlled rectifier 416 by junction 456, resistor 474, junction 476, resistor 478, junction 480 and resistor 482 and by junctions 430, 428 and 426. The controlled rectifier 416 will respond to that voltage drop to become conductive; and that controlled rectifier will serve as a low resistance connection between the right-hand ends of the windings 402 and 404. Consequently, substantially full voltage will be applied across those windings, and those windings will respond to that voltage to apply strong rotative forces to the rotor of the motor.

As the controlled rectifier 416 becomes conductive, it will "short circuit" series-connected capacitor 452 and resistor 458 and series-connected adjustable resistor 464, resistor 466 and capacitor 470. As a result, no further current will flow through those capacitors as long as the voltage between the terminals 408 and 410 is the dominant voltage of the control system of FIG. 7.

The current which flowed through the capacitor 452 before the controlled rectifier 416 became conductive established a small additional charge across that capacitor. The diode 444 will keep that capacitor from discharging through the controlled rectifier 416 as that controlled rectifier becomes conductive. The capacitor 452 will tend to discharge through the resistor 454, but the resistance of that resistor will be great enough to prevent rapid discharging of that capacitor. Consequently, the capacitor 452 will substantially retain the charge thereon.

During the time the voltage between the terminals 408 and 410 is the dominant voltage of the control system of FIG. 7, the voltage at the terminal 412 will be positive relative to the voltage at the terminal 410, and the voltage at the terminal 408 will be positive relative to the voltage at the terminal 412. The voltage between the terminals 412 and 410 will be decreasing; and, after one-third of the first cycle of the alternating current supplied to the terminals 408, 410 and 412 has elapsed, that voltage will be zero. The voltage between terminals 408 and 412 will be increasing; and, after one-third of the said first cycle has elapsed, the voltage between the terminals 408 and 412 will exceed the voltage between the terminals 408 and 410.

Thereupon, current will flow from terminal 408 via winding 402, junction 414, controlled rectifier 416, junctions 426, 428, 430, 432 and 434, diode 442, junction 422, and winding 406 to the terminal 412. The controlled rectifier 416 will serve as a low resistance connection between the right-hand ends of the windings 402 and 406; and hence substantially full voltage will be applied across those windings. Those windings will respond to that voltage to apply strong rotative forces to the rotor of the motor.

The controlled rectifier 416 will continue to "short circuit" series-connected capacitor 452 and resistor 458 and series-connected adjustable resistor 464, resistor 466 and capacitor 470. Consequently, no current will flow through the capacitors 452 and 470 as long as the voltage between the terminals 408 and 412 is the dominant voltage of the control system of FIG. 7.

After one-third of the first cycle of the alternating current supplied to the terminals 408, 410 and 412 has elapsed, the voltages at both the terminals 408 and 412 will be positive relative to the voltage at the terminal 410. This means that the voltage at the anode of the controlled rectifier 424 will be negative relative to the voltage at the cathode of that controlled rectifier; and that controlled rectifier will respond to those voltages to become non-conductive. The voltage between the terminals 408 and 410 will be decreasing; and, after one-half of the first cycle of the alternating current supplied to the terminals 408, 410 and 412 has elapsed, the voltage between the terminals 408 and 410 will be zero. The voltage between the terminals 410 and 412 will be increasing; and, after one-half of the said cycle has elapsed, the voltage between the terminals 410 and 412 will exceed the voltage between the terminals 408 and 412. Thereupon, current will flow from terminal 410 via winding 404, junction 418, diode 446, junctions 460, 462 and 450, capacitor 452, junction 456, resistor 458, junctions 430, 432 and 434, diode 442, junction 422, and winding 406 to the terminal 412. Current also will flow from terminal 410 via winding 404, junction 418, diode 446, junctions 460 and 462, adjustable resistor 464, resistor 466, junction 468, capacitor 470, junctions 432 and 434, diode 442, junction 422, and winding 406 to the terminal 412. Because the overall impedance of capacitor 452 and resistor 458 will still be many times smaller than the overall impedance of capacitor 470, resistor 466 and adjustable resistor 464, most of the current flowing past the junction 462 will flow through the capacitor 452. That current will develop a substantial voltage drop across the resistor 458; and that voltage drop will be applied to the gate-to-cathode circuit of the controlled rectifier 420 by junction 456, resistor 474, junction 476, resistor 478, and junction 480. That controlled rectifier will respond to that voltage drop to become conductive; and that controlled rectifier will serve as a low resistance connection between the right-hand ends of the windings 404 and 406. Consequently, substantially full voltage will be applied across those windings; and those windings will respond to that voltage to apply strong rotative forces to the rotor of the motor.

As the controlled rectifier 420 becomes conductive, it will "short circuit" series-connected capacitor 452 and resistor 458 and series-connected adjustable resistor 464, resistor 466 and capacitor 470. As a result, no further current will flow through those capacitors as long as the voltage between the terminals 410 and 412 is the dominant voltage of the control system of FIG. 7.

The current which flowed through the capacitor 452 before the controlled rectifier 420 became conductive established a small additional charge across that capacitor. The diode 446 will keep that capacitor from discharging through the controlled rectifier 420 as that controlled rectifier become conductive. The capacitor 452 will tend to discharge through the resistor 454, but the resistance of that resistor will be great enough to prevent rapid discharging of that capacitor. Consequently the capacitor 452 will substantially retain the charge thereon.

During the time the voltage between the terminals 410 and 412 is the dominant voltage of the control system of FIG. 7, the voltage at the terminal 408 is positive relative to the voltage at the terminal 412; and the voltage at the terminal 410 is positive relative to the voltage at the terminal 408. The voltage between the terminals 408 and 412 will be decreasing; and, after two-thirds of the first cycle of the alternating current supplied to the terminals 408, 410 and 412 have elapsed, the voltage between the terminals 408 and 412 will be zero. The voltage between the terminals 410 and 408 will be increasing; and, after two-thirds of the said cycle have elapsed, the voltage between the terminals 410 and 408 will exceed the voltage between the terminals 410 and 412.

Thereupon, current will flow from terminal 410 via winding 404, junction 418, controlled rectifier 420, junctions 426, 428, 430, 432, 434 and 436, diode 438, junction 414, and winding 402 to the terminal 408. That controlled rectifier will serve as a low resistance connection between the right-hand ends of the windings 404 and 402; and hence substantially full voltage will be applied across those windings. Those windings will respond to that voltage to apply strong rotative forces to the rotor of the motor.

The controlled rectifier 420 will continue to "short circuit" series-connected capacitor 452 and resistor 458 and series-connected adjustable resistor 464, resistor 466 and capacitor 470. As a result, no current will flow through the capacitors 452 and 470 as long as the voltage between the terminals 410 and 408 is the dominant voltage of the control system of FIG. 7.

After two-thirds of the first cycle of the alternating current supplied to the terminals 408, 410 and 412 have elapsed, the voltages at both of the terminals 410 and 412 will be positive relative to the voltage at the terminal 408. This means that the voltage at the anode of the controlled rectifier 416 will be negative relative to the voltage at the cathode of that controlled rectifier; and that controlled rectifier will respond to those voltages to become non-conductive. The voltage between terminals 410 and 412 will be decreasing; and, after five-sixths of the first cycle of the alternating current supplied to terminals 408, 410 and 412 have elapsed, the voltage between the terminals 410 and 412 will be zero. The voltage between the terminals 412 and 408 will be increasing; and, after five-sixths of that cycle have elapsed, the voltage between the terminals 412 and 408 will exceed the voltage between the terminals 410 and 408.

Thereupon, current will flow from terminal 412 via winding 406, junction 422, diode 448, junction 450, capacitor 452, junction 456, resistor 458, junctions 430, 432, 434 and 436, diode 438, junction 414, and winding 402 to the terminal 408. Current also will flow from the terminal 412 via winding 406, junction 422, diode 448, junctions 450 and 462, adjustable resistor 464, resistor 466, junction 468, capacitor 470, junctions 432, 434 and 436, diode 438, junction 414, and winding 402 to the terminal 408. Because the capacity of capacitor 452 is much larger than that of capacitor 470, most of the current flowing past the junction 450 will flow through the capacitor 452. That current will develop a substantial voltage drop across the resistor 458. That voltage drop will be applied to the gate-to-cathode circuit of the controlled rectifier 424 by junction 456, resistor 474 and junction 476 and by junctions 430 and 428; and that controlled rectifier will respond to that voltage drop to become conductive.

As the controlled rectifier 424 becomes conductive, it will serve as a low resistance connection between the right-hand ends of the windings 406 and 402; and hence substantially full voltage will be applied across those windings. Those windings will respond to that voltage to apply strong rotative forces to the rotor of the motor.

Also as the controlled rectifier 424 becomes conductive, it will "short circuit" series-connected capacitor 452 and resistor 458 and series-connected adjustable resistor 464, resistor 466 and capacitor 470. This means that no further current will flow through those capacitors as long as the voltage between the terminals 412 and 408 is the dominant voltage of the control system of FIG. 7.

The current which flowed through the capacitor 452 before the controlled rectifier 424 became conductive established a small additional charge across that capacitor. The diode 448 will keep that capacitor from discharging through the controlled rectifier 424 as that controlled rectifier becomes conductive. The capacitor 452 will tend to discharge through the resistor 454, but the resistance of that resistor will be great enough to prevent rapid discharging of that capacitor. Consequently, the capacitor 452 will substantially retain the charge thereon.

During the time the voltage between the terminals 412 and 408 is the dominant voltage of the control system of FIG. 7, the voltage at the terminal 410 is positive relative to the voltage at the terminal 408, and the voltage at the terminal 412 is positive relative to the voltage at the terminal 410. The voltage between the terminals 410 and 408 will be decreasing; and, at the end of the first cycle of the alternating current supplied to the terminals 408, 410 and 412, the voltage between the terminals 410 and 408 will be zero. The voltage between the terminals 412 and 410 will be increasing; and, after the end of the said first cycle, the voltage between the terminals 412 and 410 will exceed the voltage between the terminals 412 and 408.

Thereupon, current will flow from terminal 412 via winding 406, junction 422, controlled rectifier 424, junctions 428, 430, 432, 434 and 436, diode 440, junction 418, and winding 404 to the terminal 410. The controlled rectifier 424 will serve as a low resistance connection between the right-hand ends of the windings 406 and 404; and hence substantially full voltage will be applied across those windings. Those windings will respond to that voltage to apply strong rotative forces to the rotor of the motor.

The controlled rectifier 424 will continue to "short circuit" series-connected capacitor 452 and resistor 458 and series-connected adjustable resistor 464, resistor 466 and capacitor 470. As a result, no current will flow through the capacitors 452 and 470 as long as the voltage between the terminals 412 and 410 is the dominant voltage of the control system of FIG. 7.

After the first cycle of the alternating current supplied to the terminals 408, 410 and 412 has been completed, the voltages at both the terminals 408 and 412 will be positive relative to the voltage at the terminal 410. This means that the voltage at the anode of the controlled rectifier 420 will be negative relative to the cathode voltage of that controlled rectifier; and that controlled rectifier will respond to those voltages to become non-conductive.

Current will continue to flow through winding 406, controlled rectifier 424 and winding 404 throughout the first one-sixth of the second cycle of the alternating current supplied to the windings 408, 410 and 412. The remaining five-sixths of that second cycle will be similar to the last five-sixths of the first cycle. Similarly, a number of succeeding cycles of the alternating current supplied to the terminals 408, 410 and 412 will be similar to the said second cycle.

During each of those succeeding cycles, current will flow through winding 406, controlled rectifier 424 and winding 404, will flow through winding 402, controlled rectifier 416 and winding 404, will flow through winding 402, controlled rectifier 416 and winding 406, will flow through winding 404, controlled rectifier 420 and winding 406, will flow through winding 404, controlled rectifier 420 and winding 402, and will flow through winding 406, controlled rectifier 424 and winding 402. Also, during each of those cycles, the capacitor 452 will receive three additional charges.

After the rotor of the motor has gotten up to speed, the voltage across the capacitor 452 will be close to the value of the A.C. voltage supplied to the terminals 408, 410 and 412. This means that not enough current will be able to flow through that capacitor to develop a voltage drop across the resistor 458 which can "fire" the controlled rectifiers 416, 420 and 424. Consequently, during all subsequent cycles of the alternating current supplied to the terminals 408, 410 and 412, the controlled rectifiers 416, 420 and 424 must be "fired" by the running position of the combination starting circuit and running circuit of the control system of FIG. 7.

If it is assumed that the voltage between terminals 412 and 410 is the dominant voltage of the control system of FIG. 7 during a given subsequent cycle of the alternating current supplied to the terminals 408, 410 and 412, current will flow from terminal 412 via winding 406, junction 422, diode 448, junctions 450 and 452, adjustable resistor 464, resistor 466, junction 468, capacitor 470, junctions 432, 434 and 436, diode 440, junction 418, and winding 404 to the terminal 410. That current will charge the capacitor 470; and, when the voltage across that capacitor reaches the break-down voltage of the avalanche diode 472, that avalanche diode will become conductive. Thereupon, current will flow from the upper terminal of that capacitor via junction 468, avalanche diode 472, junction 456, resistor 458, and junctions 430 and 432 to the lower terminal of that capacitor. Also, current will flow from terminal 412 via winding 406, junction 422, diode 448, junctions 450 and 462, adjustable resistor 464, resistor 466, junction 468, avalanche diode 472, junction 456, resistor 458, junctions 430, 432, 434 and 436, diode 440, junction 418 and winding 404 to the terminal 410. The resulting voltage drop across the resistor 458 will render the controlled rectifier 424 conductive. That controlled rectifier will serve as a low resistance connection between the right-hand ends of the windings 406 and 404; and hence a substantial voltage will be applied across those windings. Those windings will respond to that voltage to apply strong rotative forces to the rotor of the motor.

As the controlled rectifier 424 becomes conductive, it will "short circuit" series-connected adjustable resistor 464, resistor 466 and capacitor 470; and hence no further current will flow through that capacitor as long as the voltage between the terminals 412 and 410 is the dominant voltage of the control system of FIG. 7. However, that capacitor will continue to discharge through the resistor 458.

During the time the voltage between the terminals 412 and 410 is the dominant voltage of the control system of FIG. 7, the voltage at the terminal 412 is positive relative to the voltage at the terminal 408; and the voltage at the terminal 408 is positive relative to the voltage at the terminal 410. The voltage between the terminals 412 and 408 is decreasing; and, at the end of one-sixth of the said subsequent cycle, the voltage between the terminals 412 and 408 will be zero. The voltage between the terminals 408 and 410 is increasing; and, after one-sixth of the said subsequent cycle, the voltage between the terminals 408 and 410 will exceed the voltage between the terminals 412 and 410.

Thereupon, current will flow from terminal 408 via winding 402, junction 414, diode 444, junctions 460 and 462, adjustable resistor 464, resistor 466, junction 468, capacitor 470, junctions 432, 434 and 436, diode 440, junction 418, and winding 404 to the terminal 410. That current will charge the capacitor 470; and, when the voltage across that capacitor reaches the break-down voltage of the avalanche diode 472, that avalanche diode will become conductive. Thereupon, current will flow from the upper terminal of that capacitor via junction 468, avalanche diode 472, junction 456, resistor 458, and junctions 430 and 432 to the lower terminal of that capacitor. Also, current will flow from terminal 408 via winding 402, junction 414, diode 444, junctions 460 and 462, adjustable resistor 464, resistor 466, junction 468, avalanche diode 472, junction 456, resistor 458, junctions 430, 432, 434 and 436, diode 440, junction 418, and winding 404 to the terminal 410. The resulting voltage drop across the resistor 458 will "fire" the controlled rectifier 416. That controlled rectifier will serve as a low resistance connection between the right-hand ends of the windings 402 and 404; and hence substantially full voltage will be applied across those windings. Those windings will response to that voltage to apply strong rotative forces to the rotor of the motor.

The the controlled rectifier 416 becomes conductive, it will "short circuit" series-connected adjustable resistor 464, resistor 466 and capacitor 470; and hence no further current will flow through that capacitor as long as the voltage between the terminals 408 and 410 is the dominant voltage of the control system of FIG. 7. However, that capacitor will continue to discharge through the resistor 458.

During the time the voltage between the terminals 408 and 410 is the dominant voltage of the control system of FIG. 7, the voltage at the terminal 412 will be positive relative to the voltage at the terminal 410, and the voltage at the terminal 408 will be positive relative to the voltage at the terminal 412. The voltage between the terminals 412 and 410 will be decreasing; and, after one-third of the said subsequent cycle of the alternating current supplied to the terminals 408, 410 and 412 has elapsed, the voltage between the terminals 412 and 410 will be zero. The voltage between the terminals 408 and 412 will be increasing; and, after one-third of the said subsequent cycle has elapsed, the voltage between the terminals 408 and 412 will exceed the voltage between the terminals 408 and 410.

Thereupon, current will flow from the terminal 408 via winding 402, junction 414, controlled rectifier 416, junctions 426, 428, 430, 432 and 434, diode 442, junction 422, and winding 406 to the terminal 412. The controlled rectifier 416 will serve as a low resistance connection between the windings 402 and 406; and hence substantially full voltage will be applied across those windings. Those windings will respond to that voltage to apply strong rotative forces to the rotor of the motor.

The controlled rectifier 416 will continue to "short circuit" series-connected adjustable resistor 464, resistor 466 and capacitor 470. Hence no current will flow through that capacitor as long as the voltage between the terminals 408 and 412 is the dominant voltage of the control system of FIG. 7.

After one-third of the said subsequent cycle of the alternating current supplied to the terminals 408, 410 and 412 has elapsed, the voltages at the terminals 408 and 410 will be positive relative to the voltage at the terminal 412. This means that the voltage at the anode of the controlled rectifier 424 will be negative relative to the cathode voltage of that controlled rectifier; and that controlled rectifier will respond to those voltages to become non-conductive. The voltage between the terminals 408 and 410 will be decreasing; and, at the end of one-half of the said subsequent cycle, the voltage between the terminals 408 and 410 will be zero. The voltage between the terminals 410 and 412 will be increasing; and, after one-half of the said subsequent cycle has elapsed, the voltage between the terminals 410 and 412 will exceed the voltage between the terminals 408 and 412.

Thereupon, current will flow from terminal 410 via winding 404, junction 418, diode 446, junctions 460 and 462, adjustable resistor 464, resistor 466, junction 468, capacitor 470, junctions 432 and 434, diode 442, junction 422, and winding 406 to the terminal 412. That current will charge the capacitor 470; and, as the voltage across that capacitor reaches the break-down voltage of the avalanche diode 472, that avalanche diode will become conductive. Thereupon, current will flow from the upper terminal of that capacitor via junction 468, avalanche diode 472, junction 456, resistor 458, and junctions 430 and 432 to the lower terminal of that capacitor. Also, current will flow from terminal 410 via winding 404, junction 418, diode 446, junctions 460 and 462, adjustable resistor 464, resistor 466, junction 468, avalanche diode 472, junction 456, resistor 458, junctions 430, 432 and 434, diode 442, junction 422, and winding 406 to the terminal 412. The resulting voltage drop across the resistor 458 will "fire" the controlled rectifier 420. That controlled rectifier will serve as a low resistance connection between the right-hand ends of the windings 404 and 406; and hence substantially full voltage will be applied across those windings. Those windings will respond to that voltage to apply strong rotative forces to the rotor of the motor.

As the controlled rectifier 420 becomes conductive, it will "short circuit" series-connected adjustable resistor 464, resistor 466 and capacitor 470; and hence no further current will flow through that capacitor as long as the voltage between the terminals 410 and 412 is the dominant voltage of the control system of FIG. 7. However, that capacitor will continue to discharge through the resistor 458.

During the time the voltage between the terminals 410 and 412 is the dominant voltage of the control system of FIG. 7, the voltage at the terminal 408 will be positive relative to the voltage at the terminal 412, and the voltage at the terminal 410 will be positive relative to the voltage at the terminal 408. The voltage between the terminals 408 and 412 will be decreasing; and, at the end of two-thirds of the said subsequent cycle, the voltage between terminals 408 and 412 will be zero. The voltage between the terminals 410 and 408 will be increasing; and, after two-thirds of the said subsequent cycle have elapsed, the voltage between the terminals 410 and 408 will exceed the voltage between the terminals 410 and 412.

Thereupon, current will flow from terminal 410 via winding 404, junction 418, controlled rectifier 420, junctions 426, 428, 430, 432, 434 and 436, diode 438, junction 414, and winding 402 to the terminal 408. The controlled rectifier 420 will serve as a low resistance connection between the windings 404 and 402; and hence substantially full voltage will be applied across those windings. Those windings will respond to that voltage to apply strong rotative forces to the rotor of the motor.

The controlled rectifier 420 will continue to "short circuit" series-connected adjustable resistor 464, resistor 466 and capacitor 470. Hence, no current will flow through that capacitor as long as the voltage between the terminals 410 and 408 is the dominant voltage of the control system of FIG. 7.

After two-thirds of the said subsequent cycle of the alternating current supplied to the terminals 408, 410 and 412 have elapsed, the voltages at both of the terminals 410 and 412 will again be positive relative to the voltage at the terminal 408. This means that the voltage at the anode of the controlled rectifier 416 will again be negative relative to the voltage at the cathode of that controlled rectifier; and that controlled rectifier will respond to those voltages to again become non-conductive. The voltage between the terminals 410 and 412 will be decreasing; and, after five-sixths of the said subsequent cycle have elapsed, the voltage between the terminals 410 and 412 will be zero. The voltage between the terminals 412 and 408 will be increasing; and, after five-sixths of the said subsequent cycle have elapsed, the voltage between the terminals 412 and 408 will exceed the voltage between the terminals 410 and 408.

Thereupon, current will flow from terminal 412 via winding 406, junction 422, diode 448, junctions 450 and 462, adjustable resistor 464, resistor 466, junction 468, capacitor 470, junctions 432, 434 and 436, diode 438, junction 414, and winding 402 to the terminal 408. That current will charge the capacitor 470; and, when the voltage across that capacitor reaches the break-down voltage of the avalanche diode 472, that avalanche diode will become conductive. Thereupon, current will flow from the upper terminal of that capacitor via junction 468, avalanche diode 472, junction 456, resistor 458, and junctions 430 and 432 to the lower terminal of that capacitor. Also, current will flow from terminal 412 via winding 406, junction 422, diode 448, junctions 450 and 462, adjustable resistor 464, resistor 466, junction 468, avalanche diode 472, junction 456, resistor 458, junctions 430, 432, 434 and 436, diode 438, junction 414, and winding 402 to the terminal 408. The resulting voltage drop across the resistor 458 will "fire" the controlled rectifier 424. That controlled rectifier will serve as a low resistance connection between the right-hand ends of the windings 406 and 402; and hence a substantial voltage will appear across those windings. Those windings will respond to that voltage to apply strong rotative forces to the rotor of the motor.

As the controlled rectifier 424 becomes conductive, it will "short circuit" series-connected adjustable resistor 464, resistor 466 and capacitor 470; and hence no further current will flow through that capacitor as long as the voltage between the terminals 412 and 408 is the dominant voltage of the control system of FIG. 7. However, that capacitor will continue to discharge through the resistor 458.

During the time the voltage between the terminals 412 and 408 is the dominant voltage of the control system of FIG. 7, the voltage at the terminal 410 is positive relative to the voltage at the terminal 408, and the voltage at the terminal 412 is positive relative to the voltage at the terminal 410. The voltage between the terminals 410 and 408 is decreasing; and, by the end of the said subsequent cycle, the voltage between the terminals 410 and 408 will be zero. The voltage between the terminals 412 and 410 will be increasing; and, during the first part of the next subsequent cycle, the voltage between the terminals 412 and 410 will exceed the voltage between the terminals 412 and 408.

Thereupon, current will flow from terminal 412 via winding 406, junction 422, controlled rectifier 424, junctions 428, 430, 432, 434 and 436, diode 440, junction 418, and winding 404 to the terminal 410. The controlled rectifier 424 will serve as a low resistance connection between the windings 406 and 404; and hence substantially full voltage will be applied across those windings. Those windings will respond to that voltage to apply strong rotative forces to the rotor of the motor.

The controlled rectifier 424 will continue to "short circuit" series-connected adjustable resistor 464, resistor 466 and capacitor 470. Hence, no current will flow through that capacitor as long as the voltage between the terminals 412 and 410 is the dominant voltage of the control system of FIG. 7.

After the said subsequent cycle of the alternating current supplied to the terminals 408, 410 and 412 has been completed, the voltages at both the terminals 408 and 412 again will be positive relative to the voltage at the terminal 410. This means that the voltage at the anode of the controlled rectifier 420 again will be negative relative to the cathode voltage of that controlled rectifier; and that controlled rectifier will respond to those voltages to become non-conductive.

Further subsequent cycles of the alternating current supplied to the terminals 408, 410 and 412 will be similar to the said next subsequent cycle. During each of those subsequent cycles, each controlled rectifier will be rendered conductive.

The numeral 484 in FIG. 8 denotes a curve which represents the voltage available to any one of the windings 402, 404 and 406 of FIG. 7. The letter T denotes that portion of the said two-thirds of the said cycle during which one of the controlled rectifiers 416, 420 and 424 can be "fired." The cross hatching is FIG. 8 indicates the power which will be supplied to the motor by one of the controlled rectifiers 416, 420 and 424 when the adjustable resistor 464 has been set to cause one of those controlled rectifiers to "fire" about thirty degrees after the dominant voltage of the control system of FIG. 7 has been applied to that controlled rectifier. That power will rotate the rotor of the motor at a relatively high speed. If the adjustable resistor 464 is set to provide a minimum value of resistance, the leading edge of the cross hatching in FIG. 8 will shift toward the left-hand end of the portion T; and the speed of the rotor of the motor will increase. If the adjustable resistor 464 is set to provide a maximum value of resistance, the leading edge of the cross hatching in FIG. 8 will shift toward the right-hand end of the portion T; and the speed of the rotor of the motor will decrease.

It will be noted that there are no moving parts in the combination starting circuit and running circuit of FIG. 7. While the adjustable resistor 464 is adjustable, that resistor need not be adjusted during the starting or running of the motor. Instead, that adjustable resistor will be adjusted only when a change in the speed of the rotor of the motor is desired. Further it will be noted that the control system of FIG. 1 does not require any bulky magnetic components such as transformers, reactors or the like. Moreover, it should be noted that the control system of FIG. 7 makes it possible to vary the speed of the rotor of the motor over an appreciable range in stepless fashion. In addition, it will be noted that substantially full A.C. voltage is applied to the motor windings during starting, regardless of the speed setting of that control system.

The circuit of FIG. 7 is less expensive than the circuit of FIG. 5 because it utilizes just one combination starting circuit and running circuit for the three controlled rectifiers 416, 420 and 424. However, the firing range of each controlled rectifier 416, 420 and 424 is only one hundred and twenty degrees, whereas the firing range of each controlled rectifier 314, 316 and 318 of FIG. 5 is two hundred and forty degrees. Consequently, the control system of FIG. 5 can provide a greater range of speed control than can the control system of FIG. 7. The capacity of the capacitor 452 in FIG. 7 will be larger than that of any of the capacitors 322, 360 and 378 in FIG. 5.

In the circuit of FIG. 7, each of the controlled rectifiers 416, 420 and 424 has the dominant voltage of that control system applied to it for one hundred and twenty degrees—even though that dominant voltage is applied to that controlled rectifier through different windings. Specifically, the controlled rectifier 416 will have the dominant voltage of the control system of FIG. 7 supplied to it from sixty degrees through one hundred and eighty degrees; but that voltage will be applied to that controlled rectifier through windings 402 and 404 from sixty degrees through one hundred and twenty degrees, and will be applied through windings 402 and 406 from one hundred and twenty degrees through one hundred and eighty degrees. The controlled rectifier 420 will have the dominant voltage of the control system of FIG. 7 applied to it from one hundred and eighty degrees through three hundred degrees; but that dominant voltage will be supplied to that controlled rectifier through the windings 404 and 406 from one hundred and eighty degrees to two hundred and forty degrees, and will be applied to that controlled rectifier through the windings 404 and 402 from two hundred and forty degrees through three hundred degrees. The controlled rectifier 424 will have the dominant voltage of the control system of FIG. 7 applied to it from three hundred degrees through sixty degrees of the succeeding cycle; and that dominant voltage will be applied to that controlled rectifier through the windings 406 and 402 from three hundred degrees through three hundred and sixty degrees, and will be applied to that controlled rectifier through the windings 406 and 404 from three hundred and sixty degrees through sixty degrees of the said succeeding cycle.

In each of the control systems shown by the drawing, the starting portion of the combination starting circuit and running circuit has a capacitor which is initially substantially free of electrical charge, and which thus constitutes a low impedance. After that capacitor receives a number of charges—many times the number of cycles of alternating current needed to cause the rotor of the motor to come up to speed—the voltage across that capacitor will be large enough to limit further flow of current through that capacitor to a value which will be too low to cause "firing" of the controlled rectifier. Thereafter, current must flow through the running portion of that combination starting and running circuit to develop the voltage drop needed to "fire" the controlled rectifier. A diode is provided to keep the capacitor of the starting portion of the combination starting and running circuit of each control system from discharging through the controlled rectifier after that controlled rectifier becomes conductive. Furthermore, in the event any charge leaks off of the capacitor of the starting portion of the combination starting circuit and running circuit, that charge will be restored. The resistor which is connected in parallel with the capacitor of the starting portion of each combination starting circuit and running circuit will have a resistance value which is too large to permit that capacitor to discharge readily. However, whenever the control system is disconnected from the source of alternating current, that resistor will constitute a discharge path for that capacitor.

It will be noted that in each of the control systems shown in the drawing, alternating current flows through the windings of the motor. In each of the control systems of FIGS. 1, 3 and 4, this desirable result is attained by connecting the main winding of the motor at the A.C. side of the bridge rectifier so it receives voltage pulses during both the positive and negative cycles of the alternating current. In the case of the control system of FIG. 2, two back-to-back controlled rectifiers are provided to enable the main winding to receive voltage pulses from both the positive and negative cycles of the alternating current. Further, in each of the control systems of FIGS. 1–4, the voltage supplied to the main winding of the motor is an A.C. voltage of adjustable magnitude. In the control systems of FIGS. 5 and 7 also, the voltage applied to the windings is an A.C. voltage of adjustable magnitude.

In applying substantially full voltage to the motor during the starting of that motor, the present invention enables that motor to provide full starting torque. Also, in providing substantially full voltage to the motors of FIGS. 1–4 during the starting thereof, the present invention makes it possible to use smaller, and hence less expensive, phase capacitors.

The control systems of the present invention are ideally suited for use where the speed of a motor should vary with changes in a predetermined condition. For example, those control systems are ideally suited for use where the speed of a motor should vary with changes in temperature, pressure, humidity, light or the like. All that need be done is make the fixed resistor in the running portion of the motor's combination starting circuit and running circuit a condition-responsive resistor. That condition-responsive resistor will respond to changes in the specified condition to change the time constant of the running portion of that combination starting circuit and running circuit; and the motor will respond to the change in that time constant to operate at a different speed.

Whereas the drawing and accompanying description have shown and described several preferred embodiments of the present invention it should be apparent to those skilled in the art that various changes may be made in the form of the invention without affecting the scope thereof.

What we claim is:

1. A control system that can be connected to a source of alternating current and to an induction motor to provide stepless control of the speed of said motor and that comprises:

(a) terminals that are connectable to a source of alternating current, (b) a variable impedance element that can have the impedance thereof varied to control the effective power supplied to said motor by said source of alternating current, and can thereby determine the torque provided by said motor and the speed of the rotor of the motor, (c) a bridge rectifier that has one input terminal thereof connected to one of said terminals via said motor and that has the other input terminal thereof connected to the other of said terminals, (d) said bridge rectifier having the output terminals thereof connected to said variable impedance element, (e) a combination starting circuit and running circuit which has a starting portion and a running portion, (f) said starting portion including a capacitor, (g) said capacitor initially being substantially free of charge so the current flowing therethrough during a given half cycle of the alternating current can promptly render said variable impedance element conductive, whereby said variable impedance element can permit large voltages to be supplied to said motor by said source of alternating current to enable said motor to provide large values of torque, (h) said capacitor continuing, during each half cycle of the alternating current until the rotor of the motor gets up to speed, to permit the current flowing therethrough to quickly render said variable impedance element conductive, whereby said variable impedance element can permit large voltages to be supplied to said motor by said source of alternating current to enable said motor to provide large values of torque, (i) said capacitor responding to the alternating current supplied to said control system to accumulate a charge, (j) said capacitor responding to a predetermined charge therein to limit the value of the current flowing therethrough during succeeding half cycles of the alternating current to a level that is too small to render said variable impedance element conductive, (k) said running portion including a second capacitor and a break-down element, (l) said second capacitor passing very little current until the first said capacitor accumulates said predetermined charge, and thereafter responding to subsequent half cycles of the alternating current to accumulate charges therein that cause said break-down element to break down, (m) said break-down element isolating the rest of said running portion from said variable impedance element but, after it breaks down, permitting said running portion to render said variable impedance element conductive, whereby said variable impedance element can permit lesser voltages to be supplied to said motor by said source of alternating current so said rotor of said motor can rotate at the desired speed.

2. A control system that can be connected to a source of alternating current and to an induction motor to provide stepless control of the speed of said motor and that comprises:

(a) terminals that are connectable to a source of alternating current, (b) a variable impedance element that can have the impedance thereof varied to control the effective power supplied to said motor by said source of alternating current, and can thereby determine the torque provided by said motor and the speed of the rotor of the motor, (c) a bridge rectifier that has the input terminals thereof connected to said terminals, (d) said bridge rectifier having the output terminals thereof connected to said variable impedance element, (e) said motor having a winding thereof connected in parallel with said input terminals of said bridge rectifier, (f) a combination starting circuit and running circuit which has a starting portion and a running portion, (g) said starting portion including a capacitor, (h) said capacitor initially being substantially free of charge so the current flowing therethrough during a given half cycle of the alternating current can keep said variable impedance element non-conductive, whereby said variable impedance element can permit large voltages to be supplied to said motor by said source of alternating current to enable said motor to provide large values of torque, (i) said capacitor continuing, during each half cycle of the alternating current until the rotor of the motor gets up to speed, to permit the current flowing therethrough to keep said variable impedance element non-conductive, whereby said variable impedance element can permit large voltages to be supplied to said motor by said source of alternating current to enable said motor to provide large values of torque, (j) said capacitor responding to the alternating current supplied to said control system to accumulate a charge, (k) said capacitor responding to a predetermined charge therein to limit the value of the current flowing therethrough during succeeding half cycles of the alternating current to a level that is too small to keep said variable impedance element non-conductive, (l) said running portion thereafter rendering said variable impedance element conductive, whereby said variable impedance element can permit lesser voltages to be supplied to said motor by said source of alternating current so said rotor of said motor can rotate at the desired speed.

3. A control system that can be connected to a source of alternating current and to an induction motor to provide control of the speed of said motor and that comprises:

(a) terminals that are connectable to a source of alternating current, (b) a variable impedance that can have the impedance thereof varied to control the effective power supplied to said motor by said source of alternating current, and can thereby determine the torque provided by said motor and the speed of the rotor of said motor, and (c) a combination starting circuit and running circuit which has a starting portion and a running portion, (d) said starting portion being capable of causing said variable impedance to have a predetermined impedance, (e) said running portion being capable of causing said variable impedance to have a second and different predetermined impedance, (f) the first said predetermined impedance permitting large voltages to be supplied to said motor by said source of alternating current to enable said motor to provide large values of torque, (g) said starting portion continuing to cause said variable impedance to have the first said predetermined impedance until the rotor of said motor up to speed, (h) said running portion thereafter causing said variable impedance to have said second and different predetermined impedance so said rotor of said motor can rotate at the desired speed, (i) said running portion including a capacitor and a breakdown element.

4. A control system that can be connected to a source of alternating current and to an induction motor to provide control of the speed of said motor and that comprises:

(a) terminals that are connectable to a source of alternating current, (b) a variable impedance that can have the impedance thereof varied to control the effective power supplied to said motor by said source of alternating current, and can thereby determine the torque provided by said motor and the speed of the rotor of the motor, and (c) a combination starting circuit and running circuit which has a starting portion and a running portion, (d) said starting portion being capable of causing said variable impedance to have a predetermined impedance, (e) said running portion being capable of causing said variable impedance to have a second and different predetermined impedance, (f) the first said predetermined impedance permitting large voltages to be supplied to said motor by said source of alternating current to enable said motor to provide large values of torque, (g) said starting portion continuing to cause said variable impedance to have the first said predetermined impedance until the rotor of said motor gets up to speed, (h) said running portion thereafter causing said variable impedance to have said second and different predetermined impedance so said rotor of said motor can rotate at the desired speed, (i) said starting portion including a capacitor that is initially substantially free of charge but that progressively becomes charged, (j) said running portion including a second capacitor and a resistor, (k) said running portion also including a break-down element.

5. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impedance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed.

6. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impedance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor.

(e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed, (h) said element in said starting portion of said combination starting circuit and running circuit being a capacitor, (i) said element receiving and accumulating electrical charges during half-cycles of the alternating current supplied by said source of alternating current.

(j) the accumulation of sufficient electrical charges by said element increasing the impedance of said starting portion of said combination starting circuit and running circuit until that impedance exceeds the impedance of said running portion of said combination starting circuit and running circuit, thereby enabling said running portion of said combination starting circuit and running circuit to subsequently control the impedance of said variable impedance.

7. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impedance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed, (h) said variable impedance and said running winding being connected in series, (i) whereby current flowing through said variable impedance flows through said running winding, (j) said starting portion of said combination starting circuit and running circuit making the first said predetermined impedance for said variable impedance low while said motor is being started, thereby permitting substantially the full voltage of said source of alternating current to be applied across said running winding while said motor is being started.

8. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impedance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed, (h) said variable impedance and said running winding being connected in parallel, (i) whereby current flowing through said variable impedance does not flow through said running winding, (j) said starting portion of said combination starting circuit and running circuit making the first said predetermined impedance for said variable impedance high while said motor is being started, thereby permitting substantially the full voltage of said source of alternating current to be applied across said running winding while said motor is being started, (k) said running portion of said combination starting circuit and running circuit making said second and different impedance for said variable impedance lower than said first said predetermined impedance.

9. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impendance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed, (h) a rectifier that rectifies the current flowing through said variable impedance while permitting alternating current to flow through said running winding, (i) an adjustable element in said running portion of said sombination starting circuit and running circuit that is adjustable to change the impedance of said running portion, and thereby adjust said second and different predetermined impedance of said variable impedance.

10. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding.

(b) the impedance of said variable impedance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impendance to have a second and different predetermined impedance, thereby enabling said running winding to receive power from said source of alternating current which will cause said motor to rotate the rotor thereof at a desired speed, (h) said running portion of said combination starting circuit and running circuit having a break-down element therein that is non-conductive while said starting portion of said combination starting circuit and running circuit is providing the first said predetermined impedance for said variable impedance, (i) said break-down element being non-conductive during part of each half-cycle of the alternating current supplied by said source of alternating current but being conductive during the rest of that half-cycle whenever said running portion of said combination starting circuit and running circuit is providing said second and different predetermined impedance for said variable impedance.

11. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impedance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started.

(g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed, (h) said variable impedance being a controlled rectifier, (i) said starting portion of said combination starting circuit and running circuit being connected to the gate of said controlled rectifier and constituting a firing circuit for said controlled rectifier, (j) said running portion of said combination starting circuit and running circuit also being connected to the gate of said controlled rectifier and constituting a second firing circuit for said controlled rectifier.

12. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impedance being variable to control the effective power which said source of alternating current supplies to said running winding during the starting and running of said motor, (c) a combination starting circuit and running circuit connectable to said source af alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed, (h) said variable impedance being a transistor.

(i) said transistor being connected in series with said running winding so current flowing through said transistor flows through said running winding, (j) said starting portion of said combination starting circuit and running circuit including the base-emitter circuit of said transistor and rendering said transistor conductive during the half-cycles of the alternating current supplied by said source of alternating current during the starting of said motor, (k) said running portion of said combination starting circuit and running circuit also including the base-emitter circuit of said transistor and rendering said transistor conductive during the half-cycles of the alternating current supplied by said source of alternating current.

13. A control system that can be connected to a source of alternating current and to an induction motor to control the speed of said motor by controlling the power which said source of alternating current supplies to the running winding of said motor and that comprises:

(a) a variable impedance connectable to said source of alternating current and to said running winding, (b) the impedance of said variable impedance being variable to control the effective power which said source of alternating current supplies to said running winding during the starting and running of said motor, (c) a combination starting circuit and running circuit connectable to said source of alternating current and connected to said variable impedance to vary the impedance of said variable impedance during the starting and running of said motor, (d) said combination starting circuit and running circuit having a starting portion providing a predetermined impedance for said variable impedance during the starting of said motor, thereby enabling said source of alternating current to supply a predetermined amount of effective power to said running winding during said starting of said motor, (e) said predetermined impedance for said variable impedance permitting said source of alternating current to supply large voltages to said running winding during said starting of said motor and thereby enabling said motor to provide large values of torque during said starting of said motor, (f) said starting portion of said combination starting circuit and running circuit having an element therein that transfers the control of the impedance of said variable impedance from said starting portion of said combination starting circuit and running circuit to said running portion of said combination starting circuit and running circuit after said motor has started, (g) said running portion of said combination starting circuit and running circuit thereafter causing said variable impedance to have a second and different predetermined impedance, thereby enabling said running winding to receive power from said source of alternating current which will cause said motor to rotate the rotor thereof at a desired speed, (h) said variable impedance being a transistor, (i) said transistor being connected in parallel with said running winding so current flowing through said transistor will not flow through said running winding, (j) said starting portion of said combination starting circuit and running circuit excluding the base-emitter circuit of said transistor, whereby said transistor will remain non-conductive during the starting of said motor, (k) said running portion of said combination starting circuit and running circuit including the base-emitter circuit of said transistor and rendering said transistor conductive during the half-cycles of the alternating current supplied by said source of alternating current after the starting of said motor and during the subsequent running of said motor.

14. A control system that can be connected to a source of polyphase alternating current and to a polyphase induction motor to control the speed of said motor by controlling the power which said surce of polyphase alternating current supplies to windings of said motor and that comprises:

(a) a plurality of variable impedances connectable to said source of polyphase alternating current and to said windings, (b) each of said variable impedances being connected in series with one of said windings, (c) the impedance of each of said variable impedances being variable to control the effective power which said source of polyphase alternating current supplies to the winding connected in series with said variable impedance, during the starting and running of said motor, (d) a plurality of combination starting circuits and running circuits, (e) each of said combination starting circuits and running circuits being connectable to said source of polyphase alternating current and connected to one of said variable impedances to vary the impedance of said one variable impedance during the starting and running of said motor, (f) each of said combination starting circuits and running circuits having a starting portion providing a predetermined impedance for the variable impedance, to which it is connected, during the starting of said motor, thereby enabling said source of polyphase alternating current to supply a predetermined amount of effective power to the winding connected to said variable impedance during said starting of said motor, (g) said predetermined impedance for each of said variable impedances permitting said source of polyphase alternating current to supply large voltages to said windings during said starting of said motor and thereby enabling said motor to provide large values of torque during said starting of said motor, (h) said starting portion of each of said combination starting circuits and running circuits having an element therein that transfers the control of the impedance of the variable impedance, to which it is connected, from said starting portion of said combination starting circuit and running circuit to said running portion of said combination starting circut and running circuit after said motor has started, (i) said running portion of each of said combination starting circuits and running circuits thereafter causing the variable impedance to which it is connected, to have a second and different predetermined impedance, thereby enabling the winding connected to said variable impedance to receive power from said source of polyphase alternating current and to coact with the other said windings to cause said motor to rotate the rotor thereof at a desired speed.

15. A control system that can be connected to a source of polyphase alternating current and to a polyphase induction motor to control the speed of said motor by controlling the power which said source of polyphase alternating current supplies to the windings of said motor and that comprises:
  (a) a plurality of variable impedances connectable to said source of polyphase alternating current and to said windings,
  (b) each of said variable impedances being connected in series with one of said windings,
  (c) the impedance of each of said variable impedances being variable to control the effective power which said source of polyphase alternating current supplies to the winding connected in series with said variable impedance during the starting and running of said motor,
  (d) a combination starting circuit and running circuit connectable to said source of polyphase alternating current and connected to all of said variable impedances to vary the impedances of said variable impedances during the starting and running of said motor,
  (e) said combination starting circuit and running circuit having a starting portion providing a predetermined impedance for each of said variable impedances during the starting of said motor, thereby enabling said source of polyphase alternating current to supply a predetermined amount of effective power to said windings during said starting of said motor,
  (f) said predetermined impedance for each of said variable impedances permitting said source of polyphase alternating current to supply large voltages to said windings during said starting of said motor and thereby enabling said motor to provide large values of torque during said starting of said motor,
  (g) said starting portion of said combination starting circuit and running circuit having an element therein that transfers the control of the impedance of each of said variable impedances from said starting portion of said combination starting circuit and running circuit to said running portion of said combination starting circuit and running circuit after said motor has started,
  (h) said running portion of said combination starting circuit and running circuit thereafter causing each of said variable impedances to have a second and different predetermined impedance, thereby enabling said windings to receive power from said source of polyphase alternating current and to cause said motor to rotate the rotor thereof at a desired speed.

References Cited
UNITED STATES PATENTS

| | | | |
|---|---|---|---|
| 3,116,445 | 12/1963 | Wright | 318—220 |
| 3,183,425 | 5/1965 | Slawson | 318—220 |
| 3,226,620 | 12/1965 | Elliott | 318—221 |
| 3,252,067 | 5/1966 | Derenbecher | 318—207 |
| 3,071,717 | 1/1963 | Gordon | 318—221 |
| 3,307,093 | 2/1967 | Wright | 318—221 |

OTHER REFERENCES

TK2798 G4g 1961 General Electric Company, Silicon Controlled Rectifier Manual, 2nd ed., pp. 2–3 and 125–127.

ORIS L. RADER, *Primary Examiner.*

G. Z. RUBINSON, *Assistant Examiner.*